(12) United States Patent
Botelho et al.

(10) Patent No.: US 6,775,451 B1
(45) Date of Patent: Aug. 10, 2004

(54) SECONDARY COATING COMPOSITION FOR OPTICAL FIBERS

(75) Inventors: John W. Botelho, Corning, NY (US); Gregory F. Jacobs, Elmira, NY (US); Huan-Hung Sheng, Horseheads, NY (US); Michael J. Winningham, Big Flats, NY (US)

(73) Assignee: Corning Incorporated, Corning, NY (US)

( * ) Notice: Subject to any disclaimer, the term of this patent is extended or adjusted under 35 U.S.C. 154(b) by 451 days.

(21) Appl. No.: 09/722,895

(22) Filed: Nov. 27, 2000

Related U.S. Application Data

(60) Provisional application No. 60/220,919, filed on Jul. 26, 2000, and provisional application No. 60/173,874, filed on Dec. 30, 1999.

(51) Int. Cl.$^7$ .......................... G02B 6/02; G02B 6/22; G02B 6/00

(52) U.S. Cl. ...................................... 385/128; 385/141

(58) Field of Search ................................ 439/122–133, 439/141–144, 147

(56) References Cited

U.S. PATENT DOCUMENTS

| | | |
|---|---|---|
| 4,147,407 A | 4/1979 | Eichenbaum et al. |
| 4,474,830 A | 10/1984 | Taylor |
| 4,486,212 A | 12/1984 | Berkey |
| 4,492,428 A | 1/1985 | Levy |
| 4,581,165 A | 4/1986 | Frank et al. |
| 4,608,409 A | 8/1986 | Coady et al. |
| 4,609,718 A | 9/1986 | Bishop et al. |
| 4,691,989 A | 9/1987 | Blyler, Jr. |
| 4,702,554 A | 10/1987 | Takahashi et al. |
| 4,720,529 A | 1/1988 | Kimura et al. |
| 4,752,112 A | 6/1988 | Mayr |
| 4,962,992 A | 10/1990 | Chapin et al. |

(List continued on next page.)

FOREIGN PATENT DOCUMENTS

| | | |
|---|---|---|
| EP | 0311186 A1 | 12/1989 |
| EP | 0530715 A1 | 10/1993 |
| EP | 0874012 A1 | 10/1998 |
| WO | WO 96/28396 | 9/1996 |
| WO | WO 98/57902 | 12/1998 |
| WO | WO99/10443 | 3/1999 |

OTHER PUBLICATIONS

U.S. patent application No. 09/301,814; filed Apr. 29, 1999, Chien et al.

Midwinter, *Optical Fibers for Transmission*, New York, John Wiley, pp. 166–178 (1979).

(List continued on next page.)

*Primary Examiner*—Chandrika Prasad
(74) *Attorney, Agent, or Firm*—Robert L. Carlson; Timothy R. Krogh

(57) ABSTRACT

The present invention relates to a composition for coating optical fibers that includes an oligomeric component present in an amount of about 15 weight percent or less and a monomeric component present in an amount of about 75 weight percent or more, where the cured product of the composition has a Young's modulus of at least about 650 MPa. When the composition is substantially devoid of the oligomeric component, the monomeric component preferably includes two or more monomers. Also disclosed are the cured products of the compositions of the present invention, optical fibers that contain secondary coatings prepared from the compositions of the present invention, methods of making such optical fibers, as well as fiber optic ribbons containing a matrix prepared from the compositions of the present invention. The invention further relates to a composition for coating optical fibers that includes an oligomeric component present in an amount of more than about 15 weight percent and a monomeric component present in an amount of less than about 82 weight percent, where the cured product of the composition has a Young's modulus of at least about 900 MPa.

45 Claims, 2 Drawing Sheets

U.S. PATENT DOCUMENTS

| | | |
|---|---|---|
| 5,104,433 A | 4/1992 | Chapin et al. |
| 5,112,658 A | 5/1992 | Skutnik et al. |
| 5,139,872 A | 8/1992 | Lapin et al. ................ 428/375 |
| 5,146,531 A | 9/1992 | Shustack |
| 5,259,060 A | 11/1993 | Edward et al. |
| 5,352,712 A | 10/1994 | Shustack |
| 5,422,182 A | 6/1995 | Oishi et al. |
| 5,486,378 A | 1/1996 | Oestreich et al. |
| 5,536,529 A | 7/1996 | Shustack |
| 5,567,794 A | 10/1996 | Barraud et al. ................ 528/70 |
| 5,664,041 A | 9/1997 | Szum |
| 5,721,800 A | 2/1998 | Kato et al. |
| 5,787,218 A | 7/1998 | Ohtaka et al. |
| 5,804,311 A | 9/1998 | Suwa et al. |
| 5,835,655 A | 11/1998 | Liu et al. |
| 5,835,656 A | 11/1998 | Oishi et al. |
| 5,837,750 A | 11/1998 | Szum et al. |
| 5,852,701 A | 12/1998 | Kato et al. |
| 5,887,104 A | 3/1999 | Sugizaki et al. |
| 5,908,873 A | 6/1999 | Shustack |
| 5,935,651 A | 8/1999 | Klocek et al. |
| 5,935,673 A | 8/1999 | Mueller |
| 5,986,018 A | 11/1999 | Yamaguchi et al. |
| 6,004,675 A | 12/1999 | Akasaka et al. |
| 6,014,488 A | 1/2000 | Shustack |
| 6,022,585 A | 2/2000 | Bourhis et al. |
| 6,054,537 A | 4/2000 | Shimizu et al. |
| 6,072,929 A | 6/2000 | Kato et al. |
| 6,584,263 B2 * | 6/2003 | Fewkes et al. ............... 385/128 |

OTHER PUBLICATIONS

Blankenship et al., "The Outside Vapor Deposition Method of Fabricating Optical Waveguide Fibers", *IEEE J. Quantum Electron.*, 18:1418–1423 (1982).

Inada, "Recent Progress in Fiber Fabrication Techniques by Vapor–phase Axial Deposition", *IEEE J. Quantum Electron.* 18:1424–1431 (1982).

Nagel et al., "An Overview of the Modified Chemical Vapor Deposition (MCVD) Process and Performance", *IEEE J. Quantum Electron.* 18:459–476 (1982).

American Society for Testing and Materials, "Standard Test Method for Tensile Properties of Thin Plastic Sheeting", Designation D 882–97, pp. 1–9.

* cited by examiner

US 6,775,451 B1

SECONDARY COATING COMPOSITION FOR OPTICAL FIBERS

CROSS-REFERENCE TO RELATED APPLICATIONS

This is application claims the benefit of U.S. Provisional Patent Application Ser. No. 60/173,874 filed on Dec. 30, 1999 and U.S. Provisional Patent Application Ser. No. 60/220,919 filed on Jul. 26, 2000, the content of which is relied upon and incorporated herein by reference in its entirety, and the benefit of priority under 35 U.S.C. § 120 is hereby claimed.

FIELD OF THE INVENTION

The present invention relates to compositions for optical fiber coatings and fiber optic ribbon matrixes, optical fibers that contain a secondary coating prepared from such compositions, methods of making such optical fibers, and fiber optic ribbons that contain a matrix prepared from such compositions.

BACKGROUND OF THE INVENTION

Optical fibers have acquired an increasingly important role in field of communications, frequently replacing existing copper wires. This trend has a significant impact in the local area networks (i.e., for fiber-to-home uses), which has seen a vast increase in the usage of optical fibers. Further increases in the use of optical fibers in local loop telephone and cable TV service are expected, as local fiber networks are established to deliver ever greater volumes of information in the form of data, audio, and video signals to residential and commercial users. In addition, use of optical fibers in home and commercial business environments for internal data, voice, and video communications has begun and is expected to increase.

Optical fibers typically contain a glass core and at least two coatings, e.g., a primary (or inner) coating and a secondary (or outer) coating. The primary coating is applied directly to the glass fiber and, when cured, forms a soft, elastic, and compliant material which encapsulates the glass fiber. The primary coating serves as a buffer to cushion and protect the glass fiber core when the fiber is bent, cabled, or spooled The secondary coating is applied over the primary coating and functions as a tough, protective outer layer that prevents damage to the glass fiber during processing and use.

Certain characteristics are desirable for the secondary coating. Before curing, the secondary coating composition should have a suitable viscosity and be capable of curing quickly to enable processing of the optical fiber. After curing, the secondary coating should have the following characteristics: sufficient stiffness to protect the encapsulated, glass fiber yet enough flexibility for handling (i.e., modulus), low water absorption, low tackiness to enable handling of the optical fiber, chemical resistance, and sufficient adhesion to the primary coating.

To achieve the desired characteristics, conventional secondary coating compositions generally contain urethane-based oligomers in large concentration with monomers being introduced into the secondary coating composition as reactive diluents to lower the viscosity. Because conventional oligomeric components are, in general, much more expensive than the monomeric components, the use of oligomers in high concentration has the effect of increasing the cost of producing secondary coating compositions as well as the resulting optical fiber. Despite the cost of using oligomeric components in high concentration, it is believed that there are no commercially viable secondary coating compositions that either contain a low concentration or are completely devoid of oligomeric components.

Thus, there remains a need for suitable secondary coating compositions which can be prepared at lower cost than conventional secondary coating compositions and yield secondary coatings with a suitable modulus and other physical properties. The present invention is directed to overcoming this deficiency in the art.

There is also a need for a coating that will reduce the sensitivity of the fiber to bending, particularly micro bending. This is especially relevant for high data rate optical fiber. A high data rate fiber is typically a single mode fiber with a large effective area. Fibers with a large effective area have an increased signal mode transmission capacity in comparison to non-large effective area fibers. However, fibers with a large effective area have a greater sensitivity to stresses, such as stresses caused by bending the fiber. These stresses can lead to distortion of the optically active region of the fiber and result in microbend signal attenuation.

SUMMARY OF THE INVENTION

One embodiment of the present invention relates to a composition for coating optical fibers. The composition includes an oligomeric component present in an amount of about 15 weight percent or less and a monomeric component present in an amount of about 75 weight percent or more, where the monomeric component includes two or more monomers when the composition is substantially devoid of the oligomeric component and the cured product of the composition has a Young's modulus of at least about 650 MPa.

Another embodiment of the present invention relates to a coating or matrix material which is the cured product of a composition of the present invention that includes an oligomeric component present in an amount of about 15 weight percent or less and a monomeric component present in an amount of about 75 weight percent or more. The-coating or matrix material is characterized by a Young's modulus of at least about 650 MPa.

Another embodiment of the present invention relates to an optical fiber that includes a glass fiber, a primary coating encapsulating the glass fiber, and a secondary coating encapsulating the primary coating. The secondary coating is the cured product of a composition that includes an oligomeric component present in an amount of about 15 weight percent or less and a monomeric component present in an amount of about 75 weight percent or more. The secondary coating is characterized by a Young's modulus of at least about 650 MPa.

A further embodiment of the present invention relates to a method of making an optical fiber of the present invention. The method includes the steps of providing a glass fiber having a primary coating, applying to the coated glass fiber a composition that includes an oligomeric component present in an amount of about 15 weight percent or less and a monomeric component present in an amount of about 75 weight percent or more, and exposing the coated glass fiber to conditions sufficient to cause polymerization of the composition to form a secondary coating. The secondary coating is characterized by a Young's modulus of at least about 650 MPa.

An alternative method of making an optical fiber of the present invention includes the steps of providing a glass fiber coated with a first composition, applying to the coated glass fiber a second composition that includes an oligomeric component present in an amount of about 15 weight percent or less and a monomeric component present in an amount of about 75 weight percent or more, and exposing the coated glass fiber to conditions sufficient to cause polymerization of the first and second compositions to form a primary coating and a secondary coating. The secondary coating is characterized by a Young's modulus of at least about 650 MPa.

Yet another embodiment of the present invention relates to a fiber optic ribbon that includes a plurality of substantially planar, substantially aligned optical fibers and a matrix encapsulating the plurality of optical fibers, where the matrix has a Young's modulus of a least about 650 MPa and is the cured product of a composition that includes an oligomeric component present in an amount of about 15 weight percent or less and a monomeric component present in an amount of about 75 weight percent or more.

An additional embodiment of the invention relates to a composition which includes an oligomeric component present in an amount of more than about 15 weight percent and a monomeric component present in an amount of less than about 82 weight percent. The cured product of the composition has a Young's modulus of at least about 900 MPa.

Another additional embodiment of the invention relates to an optical fiber that includes a glass fiber, a primary coating encapsulating the glass fiber, and a secondary coating encapsulating the primary coating. The secondary coating is a cured product of the composition that includes the oligomeric component in more than 15 weight percent and the monomeric component in an amount less than 82 weight percent. The secondary coating is characterized by a Young's modulus of at least about 900 MPa.

Embodiments of the invention also include a method of making an optical fiber. The aforementioned secondary coating including more than about 15 weight percent of the oligomeric component is applied to an optical fiber. The optical fiber is already coated with a primary coating. The secondary coating is exposed to conditions to cause the secondary coating to polymerize. In an alternative inventive method, both the primary coating and the secondary coating are exposed to conditions sufficient to cause each respective coating to polymerize.

Embodiments of the invention also include the application of the aforementioned secondary coatings having a Young's modulus of at least about 900 MPa to a large effective area fiber.

The composition of the present invention has suitable characteristics which enable its use in preparing the outer coating material on optical fibers and the matrix material on fiber optic ribbons. Moreover, when cured, the composition results in a coating or matrix material that possesses desirable characteristics with respect to water absorption, reduced microbend sensitivity, and extraction, as well as strength or modulus. Thus, suitable coating or matrix materials can be prepared from a composition that contains little or no oligomeric components, which significantly reduces the cost of preparing such compositions as well as the optical fibers and fiber optic ribbons that contain the cured product of such compositions.

DETAILED DESCRIPTION OF THE INVENTION

Figure 1:
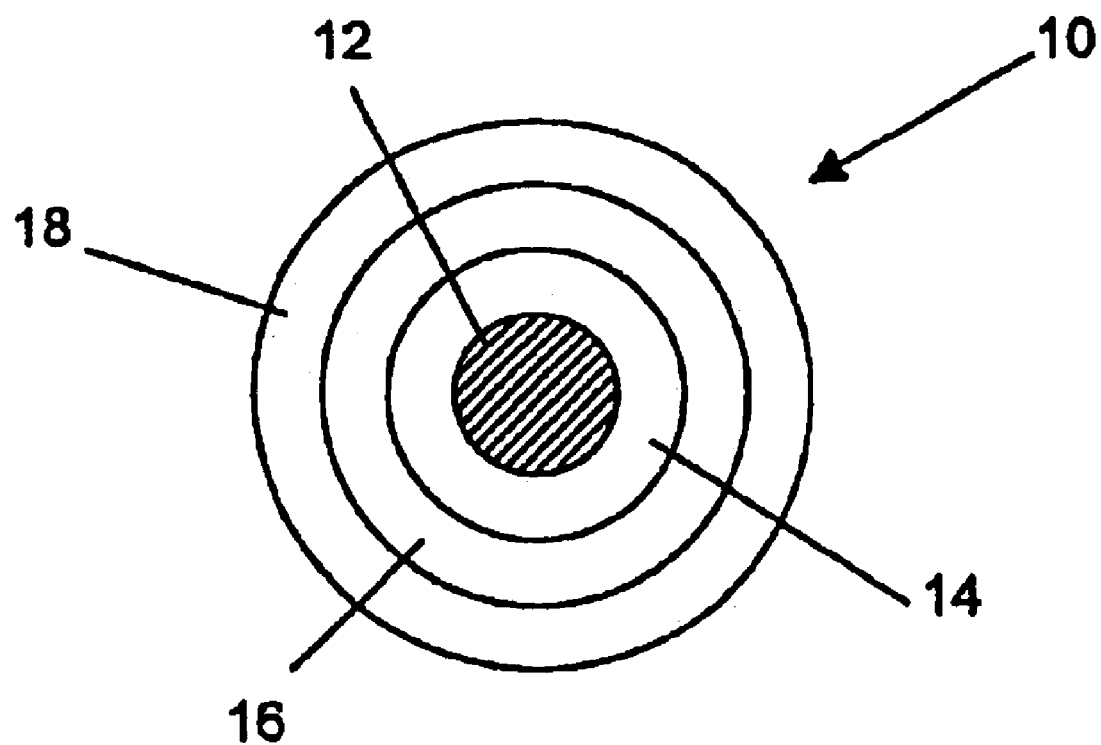
FIG. 1 is a cross sectional view of an optical fiber of the present invention.

The present invention relates to a composition for coating optical fibers. It is preferred that the inventive composition is a UV curable composition and not a thermoplastic composition. In one embodiment of the invention, the composition of the present invention includes an oligomeric component present in an amount of about 15 weight percent or less and a monomeric component present in an amount of about 75 weight percent or more. After curing, the cured product of the composition is characterized by a Young's modulus of at least about 650 MPa. Because of its physical characteristics, particularly its relatively high strength, the composition of the present invention is particularly suitable for use in preparing a secondary or outer coating of an optical fiber or a matrix of a fiber optic ribbon.

As used herein, the weight percent of a particular component refers to the amount introduced into the bulk composition, excluding other additives. The amount of other additives that are introduced into the bulk composition to produce a composition of the present invention is listed in parts per hundred. For example, an oligomer, monomer, and photoinitiator are combined to form the bulk composition such that the total weight percent of these components equals 100 percent. To this bulk composition, an amount of an additive, for example 1.0 part per hundred of an antioxidant, is introduced in excess of the 100 weight percent of the bulk composition Because of substantial cost savings in reducing the oligomer content of optical fiber coating compositions, the major constituent of the composition of the present invention is the monomeric component and the minor constituent is the oligomeric component. This is contrary to most conventional secondary coating and/or matrix compositions, which contain an oligomeric component as the major constituent and a monomeric component as the minor constituent. In most conventional coating and/or matrix compositions, the oligomeric component typically functions as the backbone upon which polymerization occurs while the monomeric component functions as a diluent for controlling the viscosity of the composition and, during curing, as a cross-linking agent (depending upon the number of functional groups a particular monomeric constituent may have).

In the composition of the present invention, the monomeric component can include a single monomer or it can be a combination of two or more monomers. Although not required, it is preferable that the monomeric component be a combination of two or more monomers when the composition is substantially devoid of the oligomeric component. Preferably, the monomeric component introduced into the composition of the present invention comprises ethylenically unsaturated monomer(s). While the monomeric component can be present in an amount of 75 weight percent or more, it is preferably present in an amount of about 75 to about 99.2 weight percent, more preferably about 80 to about 99 weight percent, and most preferably about 85 to about 98 weight percent.

Ethylenically unsaturated monomers may contain various functional groups which enable their cross-linking. The ethylenically unsaturated monomers are preferably polyfunctional (i.e., each containing two or more functional groups), although monofunctional monomers can also be introduced into the composition. Therefore, the ethylenically unsaturated monomer can be a polyfunctional monomer, a monofunctional monomer, and mixtures thereof. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers).

In general, individual monomers capable of about 80% or more conversion (i.e., when cured) are more desirable than those having lower conversion rates. The degree to which monomers having lower conversion rates can be introduced into the composition depends upon the particular requirements (i.e., strength) of the resulting cured product. Typically, higher conversion rates will yield stronger cured products.

Suitable polyfunctional ethylenically unsaturated monomers include, without limitation, alkoxylated bisphenol A diacrylates such as ethoxylated bisphenol A diacrylate with ethoxylation being 2 or greater, preferably ranging from 2 to about 30 (e.g. SR349 and SR601 available from Sartomer Company, Inc. West Chester, Pa. and Photomer 4025 and Photomer 4028, available from Henkel Corp. (Ambler, Pa.)), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (e.g., Photomer 4149, Henkel Corp., and SR499, Sartomer Company, Inc.), propoxylated-trimethylolpropane triacrylate with propoxylation being 3 or greater, preferably ranging from 3 to 30 (e.g., Photomer 4072, Henkel Corp: and SR492, Sartomer), and ditrimethylolpropane tetraacrylate (e.g., Photomer 4355, Henkel Corp.); alkoxylated glyceryl triacrylates such as propoxylated glyceryl triacrylate with propoxylation being 3 or greater (e.g., Photomer 4096, Henkel Corp. and SR9020, Sartomer); erythritol polyacrylates with and without alkoxylation, such as pentaerythritol tetraacrylate (e.g., SR295, available from Sartomer Company, Inc. (West Chester, Pa.)), ethoxylated pentaerythritol tetraacrylate (e.g., SR494, Sartomer Company, Inc.), and dipentaerythritol pentaacrylate (e.g., Photomer 4399, Henkel Corp., and SR399, Sartomer Company, Inc.); isocyanurate polyacrylates formed by reacting an appropriate functional isocyanurate with an acrylic acid or acryloyl chloride, such as tris-(2-hydroxyethyl) isocyanurate triacrylate (e.g., SR368, Sartomer Company, Inc.) and tris-(2-hydroxyethyl) isocyanurate diacrylate; alcohol polyacrylates with and without alkoxylation such as tricyclodecane dimethanol diacrylate (e.g., CD406, Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether (4 up) and the like (e.g., Photomer 3016, Henkel Corp.); and single and multi-ring cyclic aromatic or non-aromatic polyacrylates such as dicyclopentadiene diacrylate and dicyclopentane diacrylate.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate, 2-ethylhexyl acrylate, nonyl acrylate, decyl acrylate, isodecyl acrylate, undecyl acrylate, dodecyl acrylate, lauryl acrylate, octadecyl acrylate, and stearyl acrylate; aminoalkyl acrylates such as dimethylaminoethyl acrylate, diethylaminoethyl acrylate, and 7-amino-3,7-dimethyloctyl acrylate; alkoxyalkyl acrylates such as butoxyethyl acrylate, phenoxyethyl acrylate (e.g., SR339, Sartomer Company, Inc.), and ethoxyethoxyethyl acrylate; single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bomyl acrylate, isobornyl acrylate (e.g., SR423, Sartomer Company, Inc.), tetrahydrofiurfuryl acrylate (e.g., SR285, Sartomer Company, Inc.), caprolactone acrylate (e.g., SR495, Sartomer Company, Inc.), and acryloylmorpholine; alcohol-based acrylates such as polyethylene glycol monoacrylate, polypropylene glycol monoacrylate, methoxyethylenc glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (e.g., Photomer 4003, Henkel Corp.); acrylamides such as diacetone acrylamide, isobutoxymethyl acrylamide, N,N'-dimethyl-aminopropyl acrylamide, N,N-dimethyl acrylamide, N,N diethyl acrylamide, and t-octyl acrylamide; vinylic compounds such as N-vinylpyrrolidone and N-vinylcaprolactarn; and acid esters such as maleic acid ester and fumaric acid ester. With respect to the long and short chain alkyl acrylates listed above, a short chain alkyl acrylate is an alkyl group with 6 or less carbons and a long chain alkyl acrylate is alkyl group with 7 or more carbons.

Most suitable monomers are either commercially available or readily synthesized using reaction schemes known in the art. For example, most of the above-listed monofunctional monomers can be synthesized by reacting an appropriate alcohol or amide with an acrylic acid or acryloyl chloride.

As indicated above, the minor constituent of the coating composition of the present invention is the oligomeric component. The oligomeric component can include a single type of oligomer or it can be a combination of two or more oligomers. When employed, if at all, the oligomeric component introduced into the compositions of the present invention preferably comprises ethylenically unsaturated oligormers. While the oligomeric component can be present in an amount of 15 weight percent or less, it is preferably present in an amount of about 13 weight percent or less, more preferably about 10 weight percent or less. While maintaining suitable physical characteristics of the composition and its resulting cured material, it is more cost-effective and, therefore, desirable to prepare compositions containing preferably less than about 5 weight percent or substantially devoid of the oligomeric component.

When employed, suitable oligomers can be either monofunctional oligomers or polyfunctional oligomers, although polyfunctional oligormers are preferred. The oligomeric component can also be a combination of a monofunctional oligomer and a polyfunctional oligomer.

Di-functional oligomers preferably have a structure according to formula (I) below:

$$F_1-R_1-[\text{Diisocyanate-}R_2\text{-Diisocyanate}]_m-R_1-F_1 \qquad (I)$$

where $F_1$ is independently a reactive functional group such as acrylate, methacrylate, acrylamide, N-vinyl amide, styrene, vinyl ether, vinyl ester, or other functional group known in the art; $R_1$ includes, independently, $-C_{2-12}O-$, $-(C_{2-4}-O)_n-$, $-C_{2-12}O-(C_{2-4}-O)_n-$, $-C_{2-12}O-(CO-C_{2-5}O)_n-$, or $-C_{2-12}O-(CO-C_{2-5}NH)_n-$ where n is a whole number from 1 to 30, preferably 1 to 10; $R_2$ is polyether, polyester, polycarbonate, polyamide, polyurethane, polyurea, or combinations thereof; and m is a whole number from 1 to 10, preferably 1 to 5. In the structure of formula I, the diisocyanate group is the reaction product formed following bonding of a diisocyanate to $R_2$ and/or $R_1$. The term "independently" is used herein to indicate that each $F_1$ may differ from another $F_1$ and the same is true for each $R_1$.

Other polyfunctional oligomers preferably have a structure according to formula (II), formula (III), or formula (IV) as set forth below:

multiisocyanate-($_2$—$R_1$—$F_2$)$_x$      (II)

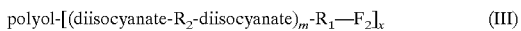

polyol-[(diisocyanate-$R_2$-diisocyanate)$_m$-$R_1$—$F_2$]$_x$      (III)

or

multiisocyanate-($R_1$—$F_2$)$_x$      (IV)

where $F_2$ independently represents from 1 to 3 functional groups such as acrylate, methacrylate, acrylamide, N-vinyl amide, styrene, vinyl ether, vinyl ester, or other functional groups known in the art; $R_1$ can include $-C_{2-12}O-$, $-(C_{2-4}-O)_n-$, $-C_{2-12}O-(C_{2-4}-O)_n-$, $-C_{2-12}O-(CO-C_{2-5}O)_n-$, or $-C_{2-12}O-(CO-C_{2-5}NH)_n-$ where n is a whole number from 1 to 10, preferably 1 to 5; $R_2$ can be polyether, polyester, polycarbonate, polyamide, polyurethane, polyurea or combinations thereof; x is a whole number from 1 to 10, preferably 2 to 5; and m is a whole number from 1 to 10, preferably 1 to 5. In the structure of formula II, the multiisocyanate group is the reaction product formed following bonding of a multiisocyanate to $R_2$. Similarly, the diisocyanate group in the structure of formula III is the reaction product formed following bonding of a diisocyanate to $R_2$ and/or $R_1$.

Urethane oligomers are conventionally provided by reacting an aliphatic diisocyanate with a dihydric polyether or polyester, most typically a polyoxyalkylene glycol such as a polyethylene glycol. Such oligomers typically have between about four to about ten urethane groups and may be of high molecular weight, e.g., 2000–8000. However, lower molecular weight oligomers, having molecular weights in the 500–2000 range, may also be used. U.S. Pat. No. 4,608,409 to Coady et al. and U.S. Pat. No. 4,609,718 to Bishop et al., which are hereby incorporated by reference, describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from about 2–250 carbon atoms and, preferably, are substantially free of ether or ester groups.

As is well known, polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system.

As is well known, optical fiber coating compositions may also contain a polymerization initiator which is suitable to cause polymerization (i.e., curing) of the composition after its application to a glass fiber or previously coated glass fiber. Polymerization initiators suitable for use in the compositions of the present invention include thermal initiators, chemical initiators, electron beam initiators, microwave initiators, actinic-radiation initiators, and photoinitiators. Particularly preferred are the photoinitiators. For most acrylate-based coating formulations, conventional photoinitiators, such as the known ketonic photoinitiating and/or phosphine oxide additives, are preferred. When used in the compositions of the present invention, the photoinitiator is present in an amount sufficient to provide rapid ultraviolet curing. Generally, this includes about 0.5 to about 10.0 weight percent, more preferably about 1.5 to about 7.5 weight percent.

The photoinitiator, when used in a small but effective amount to promote radiation cure, must provide reasonable cure speed without causing premature gelation of the coating composition. A desirable cure speed is any speed sufficient to cause substantial curing (i.e., greater than about 90%, more preferably 95%) of the coating composition. As measured in a dose versus modulus curve, a cure speed for coating thicknesses of about 25–35 $\mu$m is, e.g., less than 1.0 J/cm$^2$, preferably less than 0.5 J/cm$^2$.

Suitable photoinitiators include, without limitation, 1-hydroxycyclohexylphenyl ketone (e.g.,; Irgacure 184 available from Ciba Specialty Chemical (Tarrytown, N.Y.)), (2,6-diethoxybenzoyl)-2,4,4-trimethylpentyl phosphine oxide (e.g. in commercial blends Irgacure 1800, 1850, and 1700, Ciba Specialty Chemical), 2,2-dimethoxyl-2-phenyl acetophenone (e.g., Irgacure,651, Ciba Specialty Chemical), bis(2,4,6-trimethylbenzoyl)phenyl phosphine oxide (e.g., Irgacure 819, Ciba Specialty Chemical), (2,4,6-triethylbenzoyl)diphenyl phosphine oxide (e.g., in commercial blend Darocur 4265, Ciba Specialty Chemical), 2-hydroxy-2-methyl-1-phenylpropane-1-one (e.g., in commercial blend Darocur 4265, Ciba Specialty Chemical) and combinations thereof. Other photoinitiators are continually being developed and used in coating compositions on glass fibers. Any suitable photoinitiator can be introduced into compositions of the present invention.

In addition to the above-described components, the secondary coating composition of the present invention can optionally include an additive or a combination of additives. Suitable additives include, without limitation, antioxidants, catalysts, lubricants, low molecular weight non-crosslinking resins, adhesion promoters, and stabilizers. Some additives can operate to control the polymerization process, thereby affecting the physical properties (e.g., modulus, glass transition temperature) of the polymerization product formed formed the composition. Others can affect the integrity of the polymerization product of the composition (e.g., protect against de-polymerization or oxidative degradation).

A preferred antioxidant is thiodiethylene bis(3,5-di-tert-butyl)-4-hydroxyhydrocinnamate (e.g., Irganox 1035, available from Ciba Specialty Chemical).

A preferred adhesion promoter is an acrylated acid adhesion promoter such as Ebecryl 170 (available from UCB Radcure (Smyrna Ga.)).

Other suitable materials for use in secondary coating materials, as well as considerations related to selection of these materials, are well known in the art and are described in U.S. Pat. Nos. 4,962,992 and 5,104,433 to Chapin, which are hereby incorporated by reference. Various additives that enhance one or more properties of the coating can also be present, including the above-mentioned additives incorporated in the compositions of the present invention.

In one embodiment of the invention, the oligomeric component functions not as a backbone upon which polymerization occurs during curing of the compositions, but rather as a thickening agent to control viscosity of the final composition. As discussed hereinafter, preparation of optical fibers and fiber optic ribbons requires the composition of the present invention to be coated onto one or more previously coated glass fibers (i.e., using either wet-on-wet or wet-on-dry coating processes). To enable effective optical fiber and fiber optic ribbon production, the composition of the present invention should be sufficiently viscous at processing temperatures so that it remains on the coated glass fibers until it is cured. A suitable viscosity for the composition of the present invention is between about 250 and about 2500 centipoise at 45° C., preferably between about 300 and about 2000 centipoise at 45° C., more preferably between about 350 and about 1500 centipoise at 45° C. A preferred composition of the present invention contains about 10 weight percent of BR-301, a polyether urethane acrylate oligomer available from Bomar Specialty Chemical (Winsted, Conn.); about 22 weight percent of Phbtbmer 4025, an ethoxylated (8) bisphenol A diacrylate monomer available from Henkel; about 65 weight percent of Photomer 4028, an ethoxylated (4) bisphenol A diacrylate monomer available from Henkel; and about 3 weight percent of Irgacure 1850 photoinitiator, a commercial blend containing bis (2,6-dimethoxybenzoyl)-2,4,4-trimethylpentyl phosphine oxide and 1-hydroxycyclohexyl phenyl ketone, available from Ciba Specialty Chemical.

Another preferred composition of the present invention contains about 10 weight percent of KWS 4131, a polyether urethane diacrylate oligomer available from Bomar Specialty Chemical; about 5 weight percent of Photomer 3016, an epoxy acrylate monomer available from Henkel; about 82 weight percent of Photomer 4028, an ethoxylated(4) bisphenol A diacrylate monomer available from Henkel; about 1.5 weight percent of Irgacure 819 photoinitiator, a bis(2,4,6-trimethylbenzoyl) phenyl phosphine oxide, available from Ciba Specialty Chemical; 1.5 weight percent of Irgacure 1884 photoinitiator, a 1-hydroxycyclohexyl phenyl ketone, available from Ciba Specialty Chemical; and about 0.5 pph of Irgacure 1035 an antioxidant, a thiodiethylene bis(3,5-di-tert-butyl)-4-hydroxyhydrocinnamate available from Ciba Specialty Chemical.

Another aspect of the present invention relates to a coating or matrix material which is the cured product of a composition of the present invention.

Despite the low oligomer content of the composition of the present invention, the resulting coating or matrix material of the present invention is characterized by a high tensile strength. As measured according to ASTM D-882-97, which is hereby incorporated by reference, the tensile strength of the polymerization product of the compositions of the present invention at least about 18 MPa, preferably at least about 20 MPa, more preferably at least about 22 MPa. When measured in accordance with ASTM D-882-97, the secant modulus is at least about 350 MPa, preferably at least about 450 MPa, and more preferably at least about 550 MPa. The Young's modulus for the polymerization product of a coating composition of the present invention, when measured according to ASTM D-882-97, which is hereby incorporated by reference, is at least about 650 MPa, preferably at least about 700 MPa, and more preferably at least about 800 MPa.

In a further embodiment of the invention, the coating composition has a Young's Modulus that is at least about 900 MPa, preferably the modulus is at least about 1100 to 1300 MPa, more preferably the modulus is at least about 1700 MPa, and most preferably the modulus is at least about 2100 MPa.

A particularly useful characteristic of the coating or matrix material of the present invention is its ability to resist water absorption, since water absorption by the coating or matrix can eventually cause delimitation of the coatings from the glass fiber and/or weakening of the matrix, which may result in signal attenuation. Therefore, water absorption by the coating or matrix material of the present invention should be less than about 5 percent, preferably less than about 3 percent, more preferably less than about 2 percent.

Another useful characteristic of the coating or matrix material is its ability to resist degradation or property changes following exposure to water. Thus, it is desirable for coating or matrix materials to contain a low percentage of water-extractable components. Preferably, the coating material will contain less than about 2 percent extractable components, preferably less than about 1 percent, and more preferably less than about 0.5 percent extractable components. It is also preferred that the inventive composition has a percent elongation of less than about 30% at break. It is more preferred that the percent elongation is about 10 to about 20% at break.

The coating composition has exhibited a further useful characteristic of reducing loss due to microbend sensitivity when the coating is applied to an optical fiber. The coated optical fiber has exhibited microbend attenuation of less than about 2.25 dB/m at a wavelength of 1550 nm, preferably an attenuation of less than about 1.50 dB/m, more preferably less than about 0.53 dB/m, and most preferably less than about 0.13 dB/m. A preferred mode field diameter at 1550 nm is at least about $9.0\,\mu m^2$, more preferred is at least about $9.5\,\mu m^2$.

At a wavelength of 1625 nm, the fiber has exhibited an microbend attenuation of less than about 3.0 dB/m, preferably less than about 2.30 dB/m, more preferably less than about 0.75 dB/m, and most preferably less than about 0.20 dB/m. A preferred mode field diameter at 1625 nm is at least about $10.0\,\mu m^2$, and more preferred is at least about $10.5\,\mu m^2$. A non-exhaustive example of a coating composition which has exhibited the above microbend sensitivity, at both the 1550 nm and 1625 nm, is a coating composition with a Young's modulus of at least 900 MPa.

The inventive coating composition has an excellent application as a coating for a large effective area optical fiber, especially for fibers for high data rate, submarine, or terrestrial applications. It is preferred that the inventive coating that is applied to the fiber has a Young's modulus of at least about 900 MPa. A waveguide (a.k.a. optical fiber) having large effective area reduces non-linear optical effects, including self phase modulation, four wave mixing, cross phase modulation, and non-linear scattering processes, which can cause degradation of signals in high power systems. In general, a mathematical description of these non-linear effects includes the ratio, $P/A_{eff}$, where P is light power. For example, a non-linear optical effect can follow an equation containing a term, $\exp[PxL_{eff}/A_{eff}]$, where $L_{eff}$ efffective length. Thus an increase in $A_{eff}$ produces a decrease in the non-linear contribution to the degradation of a light signal propagating in the wave guide. The requirement in the telecommunication industry for greater information capacity over long distances, without regenerators, has led to a reevaluation of single mode fiber refractive index profile design.

The focus of this reevaluation has been to provide optical waveguides that reduce non-linear effects such as those noted above and are optimized for the lower attenuation operating wavelength range around 1550 nm, i.e., the range from about 1250 nm to 1700 nm. In addition the waveguide should be compatible with optical. amplifiers, and, retain the desirable properties of optical waveguides now deployed, such as, high strength, fatigue resistance, and bend resistance.

A waveguide fiber having at least two distinct refractive index segments has been found to have sufficient flexibility to meet or exceed the criteria for a high, performance waveguide fiber system.

The effective area of a waveguide is in general increased by designing refractive index profiles that cause the light power distribution in the fiber to be shifted outwardly from the centerline of the waveguide fiber, thus reducing the power density. In moving the power distribution outwardly toward the core edge, however, the waveguide is made more susceptible to power losses due to bending of the fiber.

Many such high performance waveguide designs are inherently more susceptible to microbend induced attenuation losses of the transmitted signal. These microbend sensitive designs require coating systems such as those of the instant invention to mitigate microbend issues.

DEFINITIONS

The following definitions are in accord with common usage in the art.

The refractive index profile is the relations hip between refractive index and waveguide fiber radius.

A segmented core is one that is divided into at least a first and a second waveguide fiber core portion or segment. Each portion or segment is located along a particular radial length, is substantially symmetric about the waveguide fiber centerline, and has an associated refractive index profile. The effective area is $A_{eff}=2\pi(\int E^2 r\, dr)^2/(\int E^4 r\, dr)$, where the integration limits are 0 to $\infty$ and E is the electric field associated with light propagated in the waveguide. An effective diameter, $D_{eff}$, may be defined as, $$A_{eff}=\pi(D_{eff}/2)^2.$$

By large effective area, we mean that the effective area of the fiber is greater than about 60 $\mu m^2$, more preferably the effective area of the fiber is greater than about 65 $\mu m^2$, and most preferably the effective area of the fiber is greater than 70 $\mu m^2$. It is possible and preferable to have a fiber with an effective area of greater than about 80 to 90 $\mu m^2$.

The relative refractive index percent, $\Delta\%=100\times(n_i^2-n_c^2)/2n_i^2$, where $n_i$ is the maximum refractive index in region i, unless otherwise specified, and $n_c$ is the average refractive index of the cladding region unless otherwise specified.

The term α-profile refers to a refractive index profile, expressed in terms of $\Delta(b)\%$, where b is radius, which follows the equation, $$\Delta(b)\%=\Delta(b_o)(1-[|b-b_o|]/(b_1-b_o)]^{\alpha} ),$$

where $b_o$ is the point at which $\Delta(b)\%$ is maximum, $b_1$ is the point at which $\Delta(b)\%$ is zero, and b is in the range $b_i \leq b \leq br$, where delta is defined above, $b_i$ is the initial point of the α-profile, $b_f$ is the final point of the α-profile, and α is an exponent which is a real number. The initial and final points of the α-profile are selected and entered into the computer model. As used herein, if an α-profile is preceded by a step index profile or any other profile shape, the beginning point of the a-profile is the intersection of the α-profile and the step profiles or other profile.

With respect to large effective area fibers for submarine applications, the coated fiber has demonstrated an attenuation of no more than about 0.23 dB/km at a wavelength of 1550 nm, preferably no more than about 0.22 dB/km, more preferably no more than about 0.20 dB/km, most preferably no more than about 0.15 dB/km. The cutoff wavelength of submarine fibers is typically in the range of about 1000 to about 2000 nm, preferably less than about 1600 nm, more preferably less than about 1500 nm, and most preferably less than about 1400 nm. The mode field diameter (MFD) is in the range of about 10.0 to about 7.0 $\mu m^2$, preferably about 9.7 to about 7.7 $\mu m^2$, and more preferably about 9.6 to about 8.0 $\mu m^2$. One example of a suitable submarine fiber is Submarine Lea® available from Corning, Incorporated of Corning, N.Y., which has an effective area of about 71 $\mu m^2$.

With respect to large effective area fibers for high data rate applications, the coated fiber has demonstrated an attenuation of no more than about 0.25.dB/km at a wavelength of 1550 nm, preferably no more than about 0.22 dB/km, more preferably no more than about 0.20 dB/kin, most preferably no more than about 0.19 dB/km. High data rate fibers have also demonstrated a polarization mode dispersion (PMD) of no more than about 0.05 $nm^{1/2}$, preferably no more than about 0.04 $ps/km^{1/2}$, more preferably no more than about 0.02 $ps/km^{1/2}$, most preferably no more than about 0.01 $ps/km^{1/2}$. The cutoff wavelength of high data rate fibers is typically in the range of about 1000 to about 2000 nm, preferably in the range of about 1500 to about 1900 nm, and more preferably in the range of about 1700 to about 1550 nm. The mode, field diameter (MFD) is in the range of about 12.0 to about 8.0 $\mu m^2$, preferably about 11.0 to about 9.0 $\mu m^2$, and more preferably about 10.0 to about 9.5 $\mu m^2$. High data rate fiber can transmit information at a rate of about 1 Gbs, preferably about 2 Gbs, and more preferably about 10 Gbs.

It is further preferred that the large effective area fiber has a core radius of about 2 to about 6 $\mu m$, more preferably about 3 to about 5 $\mu m$.

Two examples of large effective area fibers which the inventive coating may be applied to include SMT-28™ and LEAF® fibers available from Corning, Incorporated of Corning, N.Y. It is preferred that SME-28™ has a mode field diameter of at least about 9.0 $\mu m$ and a preferred change in signal attenuation @ 1550 nm and @ 70–30N of less than about 0.50 dB/m, more preferably about 0.30 dB/m or less, most preferably about 0.15 dB/m or less. The change in signal attenuation should be tested in accordance with the lateral load wire mesh test, described below in example 4. It is preferred that LEAF® has a mode field diameter of at least about 9.0 $\mu m$, more preferred at least about 9.5 $\mu m$ and a preferred change in signal attenuation @1550 nm and @ 70–30N of less than about 1.17 dB/m, more preferably about 0.80 dB/m or less, most preferably about 0.55 dB/m or less. The change in signal attenuation should be tested in accordance with the lateral load wire mesh test, described below in example 4. Two examples of compositions that may be applied to the aforementioned SMF-28™ and LEAF® fibers include a coating which consists of about 10 weight percent of a polyether-based urethane diacrylate oligomer (e.g. BR301), about 22 weight percent of an ethoxylated(8) bisphenol A diacrylate monomer (e.g. Photomer 4025), about 65 weight percent of an ethoxylated(4) bisphenol A diacrylate monomer (e.g. Photomer 4028), about 3 weight percent of a blend of 1-hydroxycyclohexyl phenyl ketone and bis(2,6-dimethoxybenzoyl)-2,4,4-trimethylpentyl phosphine oxide (e.g. Irgacure 1850), and about 0.5 pph of an antioxidant containing thiodiethylene bis(3,5-di-tert-butyl-4-hydroxy)hydrocinnamate (e.g. Irganox 1035). The composition of the second coating includes about 10 weight percent of a polyether-based urethane diacrylate oligomer (e.g. KWS4131), about 87 weight percent of an ethoxylated (4) bisphenol A diacrylate monomer (e.g. Photomer 4028), about 3 weight percent of a blend of 1-hydroxycyclohexyl phenyl ketone and bis(2,6dimethoxybenzoyl)-2,4,4- trimethylpentyl phosphice oxide (e.g. Irgacure 1850), and about 0.5 pph of an antioxidant containing thiodiethylene bis(3,5-di-tert-butyl4-hydroxy)hydrocinnamate (e.g. Irganox 1035). The above noted coating compositions is not an exhaustive list of coating compositions that may be used to practice the invention.

For additional disclosure on a large effective area fiber U.S. Provisional Patent Applications granted serial Nos. 60/145,759, filed Jul. 27, 1999, and 60/165,833, filed Nov. 16, 1999, the specifications of which are incorporated herein by reference in their entirety.

Another aspect of the present invention relates to an optical fiber prepared with a composition of the present invention. Referring to FIG. 1, the optical fiber 10 includes a, glass core 12, a cladding layer 14 surrounding and adjacent to the glass core 12, a primary coating material 16 which encapsulates and adheres to the cladding layer 14, and one or more secondary (or outer) coating materials 18 encapsulating the primary coating material 16.

Any conventional material can be used to form the glass core 12, such as those described in U.S. Pat. No. 4,486,212 to Berkey, which is hereby incorporated by reference. The core is typically a silica based glass having a cylindrical cross section and a diameter ranging from about 5 to about 10 $\mu$m for single-mode fibers and about 20 to about 100 $\mu$m for multi-mode fibers. The core can optionally contain varying amounts of other material such as, e.g., oxides of titanium, thallium, germanium, and boron, which modify the core's refractive index. Other dopants which are known in the art can also be added to the glass core to modify its properties.

The primary coating material 16 is the polymerization product of any suitable primary coating composition. A number of suitable primary coating compositions are known in the art and others are continually being developed. Typically, such conventional primary coating compositions contain a high concentration of one or more oligomeric components (e.g., polyether urethane acrylate oligomers, polyester urethane acrylate oligomers, polyurea urethane acrylate oligomers, polyether acrylate oligomers, polyester acrylate oligomers, polyurea acrylate oligomers, epoxy acrylate oligomer, and hydrogenated polybutadiene oligomers), one or more monomeric components as reactive diluents or cross-linking agents, adhesion promoters which promote adhesion of the primary coating to the underlying glass fiber, polymerization initiators, and other known additives.

It is preferred that the primary coating is a soft coating having a low Young's modulus. Preferably, the Young's modulus of the primary coating is not more than 3.0 MPa, more preferably the Young's modulus is not more than 1.5 MPa, most preferably the Young's modulus is not more than 1.0 MPa In the case that the secondary coating has a Young's modulus of more than about 1300 MPa, it is preferred that the primary coating includes a high molecular weight urethane acrylate oligomer (e.g. KWS6001 available from Bomar Speciality Co, Winsted, Conn.) and a caprolactone acrylate monomer (Tone M 100 available from Union Carbide Company, Danbury, Conn.). It is preferred that the caprolactone monomer is present in an amount greater than five (5) weight percent, and more preferably in an amount greater than fifteen (15) weight percent.

The secondary coating material 18 is the polymerization (i.e., cured) product of a composition of the present invention. The secondary coating material 18 can be a tight buffer coating or, alternatively, a loose tube coating. Irrespective of the type of secondary coating material employed, it is preferred, that the outer surface of the secondary coating material 18 not be tacky so that adjacent convolutions of the optical fiber (i.e., on a process spool) can be unwound.

It is preferred that the secondary coating has an outer surface with a coefficient of friction such that a spool of fiber can be freely and smoothly wound and rewound without causing fiber loops, fiber cross-overs, or other wind defects that impart local stresses to the fiber and lead to microbend induced attenuation losses. The coefficient of friction of the secondary coating is preferably less than about 0.43, more preferably less than about 0.38, and most preferably less than about 0.35.

The coefficient of friction was measured in accordance with the following procedure. A coating film of about 3 inches wide and 10 inches long (hereinafter "large coating film") was cast on a large glass plate and cured by Fusion conveyor belt system (available from Fusion UV of Gaithersburg, Md.). Another coating film is cast on a 5 cm by 8 cm glass plate and cured by the same Fusion system (hereinafter "small coating filmy").

The Coefficient of friction (COF) of the coating was measured by a Chatillon friction tester from Kayeness Inc, Morgantown, Pa. The large coating film is put on a sliding stage of the friction tester and the small coating film is placed against the large coating film with a total load of 'W' on top of it. The total load used to determine the COF had a mass of 120 g. This small glass plate is also connected to a load cell of the tester. The sliding stage travels and carries the large film with it when the test is initiated. The sliding stage traveled at a rate of 6 inches/minute. The load cell measures the force 'F' needed for the coating films to slide over each other. The COF of the coating is calculated by the following formula: COF=F/W. The above test was conducted at a temperature of 23° C. and a relative humidity of 50%.

In one embodiment, the coefficient of friction of the secondary coating is reduced to no more than the aforementioned limits by the inclusion of a slip agent in the formulation of the secondary coating. Preferred slip agents include an organo-modified silicone acrylate (commercially available as Tegorad 2200 from Goldschmidt Chemical Co., (Hopewell, Va.)) or polyethylenepolypropyleneglycol glyceryl ether (commercially available as Acclaim 4220 from Lyondel, formerly known as Arco Chemicals, (Newtowne Square, Pa.)). However, the invention is not limited to the aforementioned slip agents.

It is also preferred that the secondary coating is part of a dual coating system. Optionally, the dual coating system will include a coloring material, such as a pigment or dye, or an additional colored ink coating.

A secondary coating with a Young's mlodulus of at least about 900 MPa has exhibited reduction in the amount of signal attenuation loss due to microbending in a fiber for a coating composition which consists of about 15% or less of the oligomeric component. High Young's modulus coatings with more than 15% of the oligomeric component have also exhibited improved microbending properties. For coatings with more than about 15 percent of the oligomeric component, suitable oligomers include the oligomers previously cited, preferable oligomers include polyether urethane acrylate or diacrylate oligomers (e.g. BR301 available from Bomar and CN981 available from Sartomer). The oligomer is present in greater than about fifteen (15) weight percent, optionally greater than about twenty-five (25) weight percent, and further optionally up to about forty-five (45) weight percent. The non-low oligomer coating is not limited to only the aforementioned oligomers. Oligomers which may be formulated with other coating ingredients to yield a cured coating having a Young's modulus of at least about 900 MPa may be used to practice the invention.

The-coatings further typically include at least one of the aforementioned monomers and one of the aforementioned photoinitiators. The monomer or monomers is typically present in an amount of about forty (40) to about-eighty-two (82) weight percent. In the case that the coating is a multiple monomer coating, each monomer is present in an amount of at least about five (5) weight percent and up to about seventy (70) weight percent. The photoinitiator is preferably present in an amount up to about six (6) weight percent. The more than about 15% oligomer coating may include the other additives as described with respect to the coating with up to about 15% of the oligomer in the total formulation, which includes oligbmers, monomers, etc.

Another aspect of the present invention relates to a method of making an optical. fiber of the present invention. Basically, this method can be performed by standard methods with the use of a composition of the present invention.

Briefly, the process involves fabricating the glass fiber (core 12 and cladding layer 14), applying a primary coating composition to the glass fiber, polymerizing the primary coating composition to form the primary coating material 16, applying a secondary coating composition to the coated glass fiber, and polymerizing the secondary coating composition to form the secondary coating material 18. Optionally, the secondary coating composition can be applied to the coated fiber before polymerizing the primary coating composition, in which case only a single polymerization step is employed.

The core and cladding layer may be typically produced in a single operation or multi-step operation by methods which are well known in the art. Suitable methods include: the double crucible method as described, for example, in Midwinter, *Optical Fibers for Transmission*, New York, John Wiley, pp. 166–178 (1979), which is hereby incorporated by reference; rod-in-tube procedures; and doped deposited silica processes, also commonly referred to as chemical vapor deposition ("CVD") or vapor phase oxidation. A variety of CVD processes are known and are suitable for producing the core and cladding layer used in the optical fibers of the present invention. They include external CVD processes (Blankenship et al., "The Outside Vapor Deposition Method of Fabricating Optical Waveguide Fibers," *IEEE J. Quantum Electron.*, 18:1418–1423 (1982), which is hereby incorporated by reference), axial vapor deposition processes (Inada, "Recent Progress in Fiber Fabrication Techniques by Vapor-phase Axial Deposition," *IEEE J. Quantum Electron.* 18:1424–1431 (1982), which is hereby incorporated by reference), and modified CVD or inside vapor deposition (Nagel et al.,"An Overview of the Modified Chemical Vapor Deposition (MCVD) Process and Performance," *IEEE J. Quantum Electron.* 18:459–476 (1982), which is hereby incorporated by reference).

The primary and secondary coating compositions are coated on a glass fiber using conventional processes, for example, on a draw tower.

The glass fibers may be drawn from a specially prepared, cylindrical preform which has been locally and symmetrically heated to a temperature sufficient to soften the glass, e.g., of about 2000° C. for a silica glass. As the preform is heated, such as by feeding the preform into and through a furnace, a glass fiber is drawn from the molten material. The primary and secondary coating compositions are applied to the glass fiber after it has been drawn from the preform, preferably immediately after cooling. The coating compositions are then cured to produce the coated optical fiber. The method of curing can be thermal, chemical, or radiation induced, such as by exposing the applied (and uncured) coating composition on the glass fiber to ultraviolet light, actinic radiation, microwave radiation, or electron beam, depending upon the nature of the coating composition(s) and polymerization initiator being employed. It is frequently advantageous to apply both the primary coating composition and any secondary coating compositions in sequence following the draw process. One method of applying dual layers of coating compositions to a moving glass fiber is disclosed in U.S. Pat. No. 4,474,830 to Taylor, which is hereby incorporated by reference. Another method for applying dual layers of coating compositions onto a glass fiber is disclosed in U.S. Pat. No. 4,581,165 to Rannell et al., which is hereby incorporated by reference. Of course, the primary coating composition can be applied and cured to form the primary coating material 16, then the secondary coating composition(s) can be applied and cured to form the secondary coating material 18.

Still another aspect of the present invention relates to a fiber optic ribbon. The ribbon includes a plurality of substantially planar, substantially aligned optical fibers and a matrix encapsulating, the plurality of optical fibers. The matrix is the cured product of a composition of the present invention.

Figure 2:
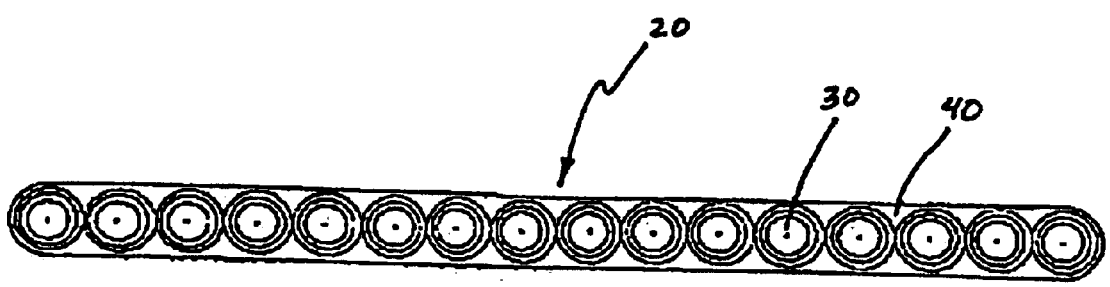
FIG. 2 is a cross-sectional view of a fiber optic ribbon of the present invention.

One embodiment of this aspect of the present invention is illustrated in FIG. 2. As shown there, fiber optic ribbon 20 of the present invention includes a plurality of single or multi-layered optical fibers 30 substantially-aligned relative to one another in a substantially planar relationship and encapsulated by matrix 40. By substantially planar, it is intended that optical fibers 30 are not displaced from a common plane by a distance of more than about one-half the diameter thereof. By substantially aligned, it is intended that the optical fibers 30 are generally parallel and co-planar with other optical fibers along the length of the fiber optic ribbon 20. In FIG. 2, the fiber optic ribbon 20 contains sixteen (16) optical fibers 30; however, it should be apparent to those skilled in the art that any number of optical fibers 30 (e.g., two or more) may be employed to form fiber optic ribbon 20 disposed for a particular use.

The fiber optic ribbons of the present invention may be encapsulated by the matrix 40 in any known configuration (e.g., edge-bonded ribbon, thin-encapsulated ribbon, thick-encapsulated ribbon, or multi-layer ribbon) by conventional methods of making fiber optic ribbons.

Basically, the fiber optic ribbon is prepared by standard methods using the composition of the present invention. For example, upon alignment of a plurality of substantially planar optical fibers, the composition of the present invention can be applied and cured according to the methods of preparing optical fiber ribbons as described in U.S. Pat. No. 4,752,112 to Mayr and U.S. Pat. No. 5,486,378 to Oestreich et al., which are hereby incorporated by reference.

EXAMPLES

The following examples are provided to illustrate embodiments of the present invention, but they are by no means intended to limit its scope.

Example 1

Preparation of Secondary Coatings

A number of compositions of the present invention were prepared with the components listed in Table 1 below using commercial blending equipment. The oligomer and monomer components were weighed and then introduced into a heated kettle and blended together at a temperature within the range of from about 50° C. to 65° C. Blending was continued until a homogenous mixture-was obtained. Next, the photoinitiator was weighed and introduced into the homogeneous solution while blending. Finally, any additives were weighed and then introduced into the solution while blending. Blending was continued until a homogeneous'solution was again obtained.

After thoroughly blending, the solution was tested for its viscosity at 25° C. and 45° C., and the solution was examined under optical microscope for the presence of particles, crystals, and phase separation.

TABLE 1

Composition Formulations

| | Oligomer | wt % | Monomer(s) | wt % | Photoinitiator | wt % | Additive(s) | pph |
|---|---|---|---|---|---|---|---|---|
| A | BR301 | 10% | SR602 | 22% | Irgacure 1850 | 3% | Irganox 1035 | 0.5 |
| | | | SR601 | 65% | | | Ebecryl 170 | 1.0 |
| B | KWS4131 | 10% | Photomer 4028 | 87% | Irgacure 1850 | 3% | Irganox 1035 | 0.5 |
| | | | | | | | Ebecryl 170 | 1.0 |
| C | BR301 | 10% | Photomer 4025 | 22% | Irgacure 1850 | 3% | Irganox 1035 | 0.5 |
| | | | Photomer 4028 | 65% | | | Ebecryl 170 | 1.0 |
| D | KWS4131 | 10% | Photomer 4028 | 50% | Irgacure 1850 | 3% | Ebecryl 170 | 1.0 |
| | | | RCC12-984 | 37% | | | | |
| E | BR301 | 10% | Photomer 4025 | 22% | Irgacure 1850 | 3% | — | |
| | | | Photomer 4028 | 65% | | | | |
| F | KWS4131 | 10% | Photomer 4028 | 50% | Irgacure 1850 | 3% | Irganox 1035 | 0.5 |
| | | | RCC12-984 | 37% | | | | |
| G | BR301 | 10% | Photomer 4025 | 17% | Irgacure 1850 | 3% | Irganox 1035 | 0.5 |
| | | | Photomer 4028 | 40% | | | | |
| | | | RCC12-984 | 30% | | | | |
| H | RCC12-892 | 10% | Photomer 4025 | 12% | Irgacure 1850 | 3% | Irganox 1035 | 0.5 |
| | | | Photomer 4028 | 35% | | | | |
| | | | RCC12-984 | 40% | | | | |
| I | — | | Photomer 4025 | 37% | Irgacure 1850 | 3% | Irganox 1035 | 0.5 |
| | | | Photomer 4028 | 40% | | | | |
| | | | RCC12-984 | 20% | | | | |
| J | KWS5021 | 10% | Photomer 4025 | 20% | Irgacure 1850 | 3% | Irganox 1035 | 0.5 |
| | | | Photomer 4028 | 22% | | | | |
| | | | RCC12-984 | 45% | | | | |
| K | BR301 | 10% | SR601 | 30% | Irgacure 1850 | 3% | — | |
| | | | SR602 | 27% | | | | |
| | | | SR349 | 30% | | | | |
| L | — | | SR601 | 30% | Irgacure 1850 | 3% | — | |
| | | | SR602 | 37% | | | | |
| | | | SR349 | 30% | | | | |
| M | Photomer 6010 | 10% | Photomer 4025 | 20% | Irgacure 1850 | 3% | — | |
| | | | Photomer 4028 | 42% | | | | |
| | | | RCC12-984 | 25% | | | | |
| N | — | | SR601 | 30% | Irgacure 1850 | 3% | — | |
| | | | SR602 | 37% | | | | |
| | | | SR349 | 15% | | | | |
| | | | SR399 | 15% | | | | |
| O | — | | SR602 | 30% | Irgacure 1850 | 3% | — | |
| | | | SR349 | 37% | | | | |
| | | | SR499 | 30% | | | | |
| P | BR301 | 5% | SR601 | 30% | Irgacure 1850 | 3% | — | |
| | | | SR602 | 32% | | | | |
| | | | SR349 | 30% | | | | |
| Q | BR301 | 10% | SR601 | 30% | Irgacure 1850 | 3% | — | |
| | | | SR602 | 27% | | | | |
| | | | SR349 | 30% | | | | |
| R | KWS4131 | 5% | SR601 | 30% | Irgacure 1850 | 3% | — | |
| | | | SR602 | 32% | | | | |
| | | | SR349 | 30% | | | | |
| S | KWS4131 | 10% | SR601 | 30% | Irgacure 1850 | 3% | — | |
| | | | SR602 | 27% | | | | |
| | | | SR349 | 30% | | | | |
| T | RCC13-572 | 5% | SR601 | 30% | Irgacure 1850 | 3% | — | |
| | | | SR602 | 32% | | | | |
| | | | SR349 | 30% | | | | |
| U | RCC13-572 | 10% | SR601 | 30% | Irgacure 1850 | 3% | — | |
| | | | SR602 | 27% | | | | |
| | | | SR349 | 30% | | | | |
| V | BR301 | 18.2% | Photomer 4025 | 15.4% | Irgacure 1850 | 2.7% | — | |
| | | | Photomer 4028 | 36.4% | | | | |
| | | | RCC12-984 | 27.3% | | | | |

Of the ligomers listed in Table 1, BR301 is a polyether-based urethane diacrylate oligomer available from Bomar Specialty Co., Photomer 6010 is an aliphatic urethane acrylate oligomer available from Henkel Corp., KWS5021 is an aliphatic urethane acrylate oligomer available from Bomar Specialty Co., RCC12-892 is a multi-functional aliphatic urethane acrylate oligomer available from Henkel Corp., RCC13-572 is an aromatic urethane diacrylate oligomer available from Henkel Corp., and KWS4131 is a polyether-based urethane diacrylate oligomer available from Bomar Specialty Co.

Of the monomers listed in Table 1, SR601 is an ethoxylated(4) bisphenol A diacrylate monomer available from Sartomer Company, Inc., SR602 is a ethoxylated(10) bisphenol A diacrylate monomer available from Sartorer Company, Inc., SR349 is an ethoxylated(2) bisphenol A diacrylate monomer available from Sartomer Company, Inc., SR399 is a dipentaerythritol pentaacrylate available from Sartomer Company, Inc., SR499 is an ethoxylated(6) trimethylolproppane triacrylate available from Sartomer Company, Inc., Photomer 4025 is an ethoxylated(8) bisphenol A diacrylate monomer available from Henkel Corp., Photomer 4028 is an ethoxylated(4) bisphenol A diacrylate monomer available from Henkel Corp., and RCC12-984 is an ethoxylated(3) bisphenol A diacrylate monomer available from Henkel Corp.

Of the photoinitiators listed in Table 1, Irgacure 1850 is a blend of 1-hydroxycyclohexyl phenyl ketone and bis(2, 6imethoxybenzoyl)-2,4,4- trimethylpentyl phosphine oxide available from Ciba Specialty Chemical.

Of the additives listed in Table 1, Irganox 1035 is an antioxidant containing thiodiethylene bis(3,5-di-tert-butyl-4-hydroxy)hydrocinnamate available from Ciba Specialty Chemical and Ebecryl 170 is an adhesion promoter having arylate and acid functionality available from UCB Radcure.

After preparing and examining the formulations, they were then applied to a solid surface at a thickness of about 75 μm and cured with ultraviolet radiation at a dose level of about 0.25 to 1.0 J/cm² using a D bulb (available from Fusion UV Systems, Inc. (Gaithersburg, Md.)). Cured coating films were then removed from the solid surface and the resulting coating material was tested for its strength and water absorption. The results of these tests are listed in Table 2 below.

TABLE 2

Properties of Coatings/Composition

|   | Elongation (%) | Tensile Strength (MPa) | Young's Modulus (MPa) | Water Absorption (%) | Viscosity at 25°/45° C. (poise) |
|---|---|---|---|---|---|
| A | 15.2 | 21.67 | 936.59 | — | 21.9/3.6 |
| B | 12.9 | 23.8 | 983.36 | 1.63 | 29.3/5.6 |
| C | 14.7 | 20.28 | 949.72 | 1.69 | 20.3/3.7 |
| D | 11.5 | 27.42 | 1199.92 | — | — |
| E | 12.6 | 20.19 | 971.46 | 1.78 | 20.9/3.7 |
| F | 15.83 | 26.67 | 947.06 | 1.61 | 35.0/6.1 |
| G | 18.7 | 27.69 | 1065.52 | 1.66 | 25.0/3.9 |
| H | 13.1 | 27.69 | 1079.0 | 1.21 | 19.6/3.4 |
| I | 24.2 | 20.10 | 531.85 | 2.07 | 11.2/2.2 |

TABLE 2-continued

Properties of Coatings/Composition

|   | Elongation (%) | Tensile Strength (MPa) | Young's Modulus (MPa) | Water Absorption (%) | Viscosity at 25°/45° C. (poise) |
|---|---|---|---|---|---|
| J | 15.14 | 27.78 | 979.2 | 1.31 | 24.3/3.9 |
| K | 25.83 | 27.47 | 958.88 | 1.66 | 23.7/3.8 |
| L | 23.31 | 24.20 | 892.40 | 1.81 | 12.0/2.2 |
| M | 22.41 | 17.01 | 803.52 | — | 20.2/3.8 |
| N | 10.34 | 27.56 | 1229.41 | 1.81 | 13.2/2.6 |
| O | 11.83 | 19.28 | 835.46 | — | 5.4/— |
| P | 12.81 | 23.80 | 1082.02 | 1.66 | 16.2/2.9 |
| Q | 25.83 | 27.47 | 958.88 | 1.66 | 23.7/3.8 |
| R | 21.81 | 20.65 | 653.41 | 2.14 | 20.4/3.9 |
| S | 19.17 | 18.70 | 656.55 | 2.78 | 32.0/6.3 |
| T | 22.54 | 22.26 | 763.78 | 1.40 | 18.1 /3.3 |
| U | 11.46 | 18.11 | 808.32 | 1.55 | 27.0/4.8 |
| V | 22.5 | 28.78 | 997.05 | 1.73 | 45.0/6.5 |

In testing the strength (i.e., modulus) of the cured materials, procedures set forth ASTM D882-97 (which is hereby incorporated by reference) were followed except at a fixed strain rate of 2.5 cm/minute was employed under environmental conditions of 23° C. and 50% relative humidity.

In testing viscosity, a Brookfield CAP2000 (cone and plate) viscometer was used. A volume of the composition (i.e., about 3–4 drops) was introduced into a cell and then heated to either 25° C. or 45° C. After reaching the desired temperature, viscosity readings were obtained from the viscometer. Viscosity results for the uncured liquid coatings are listed in Table 2.

Example 2

Preparation of Optical Fibers

Using compositions prepared as described in Example 1, primary and secondary coating materials were applied to drawn glass fibers subsequent to cooling. The glass fiber, having a diameter of about 125 μm, was introduced into a chamber containing a primary coating composition. The primary coating compositions are set forth in Table 3 below:

TABLE 3

Primary Coating Compositions Components

|   | Oligomer | wt % | Monomer(s) | wt % | Photoinitiator | wt % | Adhesion Promoter | pph | Additive(s) | pph |
|---|---|---|---|---|---|---|---|---|---|---|
| 1 | BR3731 | 52% | Photomer 4003 | 45% | Irgacure 1850 | 3% | Bis(trimethoxysilylethyl)benzene | 1.0 | Irganox 1035 | 1.0 |
|   |   |   |   |   |   |   |   |   | Tegorad 2200 | 0.5 |
| 2 | BR3731 | 52% | Photomer 4003 | 25% | Irgacure 1850 | 3% | Bis(trimethoxysilylethyl)benzene | 1.0 | Irganox 1035 | 1.0 |
|   |   |   | Tone M-100 | 20% |   |   |   |   | Tegorad 2200 | 0.5 |
| 3 | BR3731 | 52% | SR504 | 25% | Irgacure 1850 | 3% | Bis(trimethoxysilylethyl)benzene | 1.0 | Irganox 1035 | 1.0 |
|   |   |   | Tone M-100 | 20% |   |   |   |   | Tegorad 2200 | 0.5 |
| 4 | BR3731 | 52% | SR504 | 25% | Irgacure 1850 | 3% | Bis(trimethoxysilylethyl)benzene | 1.0 | Irganox 1035 | 1.0 |
|   |   |   | Tone M-100 | 20% |   |   |   |   | Tegorad 2200 | 0.5 |
|   |   |   |   |   |   |   |   |   | Acclaim 3201 | 1.0 |
| 5 | BR3731 | 52% | SR504 |   | 45% Irgacure 1850 | 3% | Bis(trimethoxysilylethyl)benzene | 1.0 | Irganox 1035 | 1.0 |
|   |   |   |   |   |   |   |   |   | Tegorad 2200 | 0.5 |
|   |   |   |   |   |   |   |   |   | Unitac R40 | 1.0 |
| 6 | BR3731 | 52% | Photomer 4003 | 45% | Irgacure 1850 | 3% | Bis(trimethoxysilylethyl)benzene | 1.0 | Irganox 1035 | 1.0 |
|   |   |   |   |   |   |   |   |   | Tegorad 2200 | 0.5 |
| 7 | BR3731 | 52% | Photomer 4003 | 25% | Irgacure 1850 | 3% | Bis(trimethoxysilylethyl)benzene | 1.0 | Irganox 1035 | 1.0 |
|   |   |   | Tone M-100 | 20% |   |   |   |   | Tegorad 2200 | 0.5 |
|   |   |   |   |   |   |   |   |   | Acclaim 3201 | 1.0 |

TABLE 3-continued

Primary Coating Compositions Components

| | Oligomer | wt % Monomer(s) | wt % Photoinitiator | wt % Adhesion Promoter | pph | Additive(s) | pph |
|---|---|---|---|---|---|---|---|
| 8 | BR3731 | 52% Photomer 4003 | 45% Irgacure 1850 | 3% Bis(trimethoxysilylethyl)benzene | 1.0 | Irganox 1035 | 1.0 |
| | | | | | | Tegorad 2200 | 0.5 |
| | | | | | | Unitac R40 | 1.0 |

Each of the primary coating compositions was prepared as set forth in U.S. patent application Ser. No. 09/301,814, filed Apr. 29, 1999, to Fewkes et al., which is hereby incorporated by reference.

Of the components listed in Table 3 above, BR3731 is a polyether urethane acrylate available from Bomar Specialty Co., Photomer 4003 is a ethoxylated nonylphenol acrylate available from Henkel Corp., SR504 is an ethoxylated nonylphenol acrylate monomer available from Sartomer Company, Inc., Tone M-100 is a caprolactone acrylate available -from Union Carbide Corp. (Danbury, Conn.), Irgacure 1850 is a photoinitiator commercial blend of 1-hydroxycyclohexyl phenyl ketone and bis(2,6-dimethoxybenzoyl)-2,4,4-trimethylpentyl phosphine oxide available from Ciba Specialty Chemical, Irganox 1035 is an antioxidant containing thiodiethylene bis(3,5-di-tert-butyl4-hydroxy) hydrocinnamate available from Ciba Specialty Chemical, Tegorad 2200 is a polyalkoxypolysiloxane available from Goldschmidt Chemical Co., Acclaim 3201 is a polyethylene-co-polypropylene glycol available from Lyondell (Newtown Square, Pa.), and Unitac R40 is a tackifier tall oil rosin ester available from Union Camp Corp. (Wayne, N.J.).

As the coated fiber was removed from the chamber, the thickness of the primary coating composition was adjusted so that the cured coating thickness would be about 32.5 μm. The coating thickness was adjusted by passing the coated fiber through a die. The primary coating composition was then cured with ultraviolet radiation at a dose level of about 0.2 to 10 J/cm$^2$ using a D bulb (available from Fusion UV Systems, Inc.). The coated fiber was drawn through a second coating chamber. containing one of the secondary coating compositions listed in Table 1 above. As the coated fiber was removed from the second chamber, the thickness of the secondary coating composition was adjusted so that the cured coating thickness would be about 27.5 μm. The secondary coating thickness was also adjusted by passing the coated fiber through a die. The secondary coating composition was then cured with ultraviolet radiation at a dose level of about 0.2 to 1.0 J/cm$^2$ using a D bulb to produce an optical fiber having a diameter of about 245±10 μm. Optical fibers were aged at ambient laboratory, conditions for two weeks prior to testing the fibers for suitability of the secondary coating material.

For purposes of clarity, fibers coated by composition A are hereinafter referred to as fiber A, fibers coated by composition B are hereinafter referred to as fiber B, and so on. To distinguish between fibers prepared with the same secondary coating, the fibers are referred to by both their primary and secondary coatings, for example, fiber $A_1$, fiber $A_2$, and so on.

Example 3

Fiber Testing for Secondary Coating Suitability

Spooled and aged optical fibers prepared as described in Example 2 were initially examined for defects by analyzing a 10 cm long piece of optical fiber. Analysis of the coating materials, particularly the secondary coating materials, involved performance of several tests, including (1) dry/wet strip force, (2) water absorption and extraction, and (3) water induced delamination or microscopic delamination.

Strip Force

A strip force test was performed according to FOTP-178 (which is hereby incorporated by reference), whereby coated fibers are placed into a load cell and then stripped at a rate of 0.847 cm/second under environmental conditions of 23° C. at 50% relative humidity. To be commercially useful, the measured strip force must fall between about 0.2 and about 2.0 pounds (about 0.09 and about 0.9 kilograms). The strip force test was applied to dry and wet fibers. Wet fibers were soaked in water for 14 days at room temperature prior to conducting the strip force test. The results of the strip force test are shown in Table 4 below.

TABLE 4

Strip Force Test Measurements

| | Dry Strip Force in lb (kg) | Wet Strip Force in lb (kg) | % Change (Dry to Wet) |
|---|---|---|---|
| $A_3$ | 0.81(0.367) | 0.38(0.172) | −53.1 |
| $B_2$ | 0.51(0.231) | 0.42(0.190) | −17.6 |
| $B_6$ | 0.42(0.190) | 0.36(0.163) | −14.3 |
| $C_2$ | 0.70(0.317) | 0.48(0.218) | −31.4 |
| $C_6$ | 0.62(0.281) | 0.42(0.190) | −32.3 |
| $E_4$ | 0.50(0.227) | 0.26(0.118) | −48.0 |
| $F_3$ | 0.40(0.181) | 0.38(0.172) | −5.0 |
| $F_4$ | 0.57(0.317) | 0.45(0.204) | −21.1 |
| $F_5$ | 0.47(0.213) | 0.40(0.181) | −14.9 |
| $F_6$ | — | 0.29(0.132) | — |
| $F_7$ | 0.49(0.222) | 0.48(0.218) | −2.0 |
| $F_8$ | 0.45(0.204) | 0.38(0.172) | −15.6 |
| $G_3$ | 0.61(0.277) | 0.37(0.168) | −39.3 |
| $G_4$ | 0.55(0.249) | 0.42(01.90) | −23.6 |
| $G_5$ | 0.63(0.286) | 0.39(0.177) | −38.1 |
| $G_8$ | 0.57(0.317) | 0.34(0.154) | −40.4 |
| $H_3$ | 0.60(0.272) | 0.37(0.168) | −38.3 |
| $H_4$ | 0.57(0.317) | 0.41(0.186) | −28.1 |
| $H_5$ | 0.72(0.327) | 0.36(0.163) | −50.0 |
| $H_7$ | — | 0.49(0.222) | — |
| $H_8$ | 0.73(0.331) | 0.38(0.172) | −47.9 |
| $I_6$ | — | 0.22(0.100) | — |
| $I_7$ | 0.47(0.213) | 0.34(0.154) | −27.7 |
| $I_8$ | 0.54(0.245) | 0.24(0.109) | −55.6 |
| $J_8$ | 0.52(0.236) | 0.24(0.109) | −53.8 |
| $L_3$ | 0.56(0.254) | 0.58(0.263) | +3.6 |
| $M_7$ | 0.57(0.317) | 0.33(0.150) | −34.3 |
| $Q_3$ | 0.67(0.304) | 0.43(0.195) | −35.8 |
| $V_6$ | — | 0.36(0.163) | — |

All of the tested fibers possessed adequate strippability under both dry and wet conditions. Of the fibers tested under both wet and dry conditions, fibers B, C, F, and L generally exhibited a consistently smaller reduction in strip force (comparing dry to wet) in comparison to fibers A, E, G, H, I, J, M, and Q.

Water Absorption/Extraction

Water absorption and extraction is performed by submerging a 300 cm sample of optical fiber in water for 24 hours with its cut ends above the water surface, which limits any absorption of water to radial penetration of the coatings. The mass of the optical fiber is measured following 24 hour exposure toga desiccator (i.e., before soaking), immediately after soaking, and following a drying time of 24 hours in the desiccator. To determine the change in mass due to water extraction, the mass after drying is subtracted from the mass before soaking. The percentage of extraction is calculated by dividing the change in mass by the mass before soaking. To determine the change in mass due to water absorption, first the change in mass due to extraction is subtracted from the mass after soaking (adjusted after soak mass) and then the difference between the adjusted after soak mass and the mass before soaking is determined. The percentage of water absorption is calculated by dividing the change in mass due to water absorption by the mass before soaking. The results of water absorption/extraction are shown in Table 5 below.

TABLE 5

Water Absorption/Extraction Measurements

| | Water Absorption (%) | Water Extraction (%) |
|---|---|---|
| $A_3$ | 1.36 | 0.10 |
| $B_2$ | 1.75 | 0.18 |
| $B_6$ | 1.59 | 0.10 |
| $C_2$ | 1.44 | 0.17 |
| $C_6$ | 1.20 | 0.02 |
| $E_4$ | 1.46 | 0.09 |
| $F_3$ | — | — |
| $F_4$ | 1.76 | 0.28 |
| $F_5$ | 1.58 | 0.06 |
| $F_6$ | — | — |
| $F_7$ | 2.38 | 0.02 |
| $F_8$ | 2.23 | 0.10 |
| $G_3$ | — | — |
| $G_4$ | 1.46 | 0.13 |
| $G_5$ | — | — |
| $G_8$ | 1.74 | 0.07 |
| $H_3$ | 0.98 | −0.02 |
| $H_4$ | 1.39 | 0.11 |
| $H_5$ | — | — |
| $H_7$ | — | — |
| $H_8$ | 1.54 | 0.09 |
| $I_6$ | — | — |
| $I_7$ | 1.97 | 0.02 |
| $I_8$ | 2.14 | 0.13 |
| $J_8$ | 1.77 | 0.21 |
| $L_3$ | — | — |
| $M_7$ | 1.87 | 0.18 |
| $Q_3$ | — | — |
| $V_6$ | — | — |

All of the tested fibers possessed sufficiently low water absorption and extraction.

Delamination

Samples from fibers were soaked in water at room temperature and at a temperature of about 65° C. for a duration of either 14 days, 30 days, or 60 days. The length of tested fiber must be sufficiently long to allow the ends of the fiber to remain above the water surface while soaking, which limits any effect of the water to radial penetration of the coatings. Following the predetermined soaking time, each sample was examined by microscopic analysis at 100× magnification of 10 cm sections of the optical fiber for the presence of delamination sites (i.e., large areas of separation between the primary coating and the glass fiber) or sites of micro-delamination ("MD"). The MD sites are relatively small delamination sites, although there is no size limitation distinguishing the MD from larger delaminations. The frequency and the size of the MD are counted and reported as the number of MD in the 10 cm section examined. If a sample fiber displayed delamination at a particular temperature, subsequent examinations (e.g., 30 day or 60 day) were often not performed. The results of the examination are shown in Table 6 below.

TABLE 6

Delamination Soak Test

| | Room Temperature Soak | | | 65° C. Soak | | |
|---|---|---|---|---|---|---|
| | 14 day | 30 day | 60 day | 14 day | 30 day | 60 day |
| $A_3$ | No MD | No MD | — | 1 MD (0.30 mm) | No MD | — |
| $B_2$ | No MD | No MD | No MD | No MD | ~50% delam. | ~50% delam. |
| $B_6$ | No MD | No MD | No MD | No MD | No MD | No MD |
| $C_2$ | No MD | No MD | No MD | No MD | No MD | No MD |
| $C_6$ | No MD | No MD | No MD | No MD | No MD | No MD |
| $E_4$ | No MD | No MD | No MD | No MD | >80 MD (0.29 mm) | No MD |
| $F_3$ | No MD | — | — | Few MD (0.006 mm) | — | — |
| $F_4$ | No MD | No MD | No MD | No MD | No MD | 1 MD (0.06 mm) |
| $F_5$ | No MD | No MD | No MD | No MD | No MD | No MD |
| $F_6$ | No MD | No MD | — | 4 MD (20.2 mm) | ~25% delam. | — |
| $F_7$ | No MD | No MD | — | 2 MD (1.12 mm) | 1 MD (6.28 mm) | — |
| $F_8$ | No MD | — | No MD | No MD | — | No MD |
| $G_3$ | No MD | No MD | — | No MD | No MD | — |
| $G_4$ | No MD | No MD | No MD | 1 MD (0.94 mm) | 1 MD (1.0 mm) | No MD |
| $G_5$ | No MD | No MD | — | 1 MD (0.39 mm) | No MD | — |
| $G_8$ | No MD | — | No MD | No MD | — | No MD |
| $H_3$ | No MD | No MD | 1 MD (0.05 mm) | No MD | No MD | No MD |
| $H_4$ | No MD | No MD | No MD | No MD | No MD | No MD |
| $H_5$ | No MD | No MD | — | No MD | No MD | — |
| $H_7$ | No MD | No MD | — | 2 MD (13.0 mm) | 1 MD (11.1 mm) | — |
| $H_8$ | No MD | — | No MD | No MD | — | ~50%/delam. |
| $I_6$ | No MD | No MD | — | 6 MD (4.9 mm) | 1 MD (2.8 mm) | — |
| $I_7$ | No MD | No MD | No MD | No MD | No MD | No MD |
| $I_8$ | No MD | — | No MD | No MD | — | No MD |
| $J_8$ | No MD | 2 MD (0.18 mm) | No MD | ~60% delam. | ~50% delam. | — |
| $L_3$ | No MD | No MD | No MD | 1 MD (0.01 mm) | 3 MD (0.04 mm) | 7 MD (0.07 mm) |
| $M_7$ | No MD | No MD | No MD | No MD | ~20% delam. | No MD |
| $Q_3$ | 1 MD (0.04 mm) | No MD | 2 MD (0.05 mm) | 8 MD (0.03 mm) | 7 MD (0.06 mm) | 8 MD (0.05 mm) |
| $V_6$ | No MD | No MD | — | ~30% delam. | ~45% delam. | — |

In some instances the size of the MD were measured, in which case the size of the largest MD present is listed in parenthesis.

While certain optic fibers (i.e., containing a specific combination of primary and secondary coatings) displayed significant delaminations or MD, the results of the delamination soak test do not indicate that any composition of the present invention is unsuitable for preparing secondary coatings.

Example 4

Microbend Sensitivity

A number of compositions of the present invention were prepared with the components listed in Table 7 below using commercial blending equipment. The oligomer and monomer components were weighed and then introduced into a heated kettle and blended together at a temperature within the range of from about 50° C. to 65° C. Blending was continued until a homogenous mixture was obtained. Next, the photoinitiator was weighed and introduced into the homogeneous solution while blending. Finally, any additives were weighed and then introduced into the solution while blending. Blending was continued until a homogeneous solution was again obtained. After thoroughly blending, the solution was tested for its viscosity at 25° C. and 45° C., and the solution was examined under an optical microscope for the presence of particles, crystals, and phase separation.

Of the monomers listed in Table 7, SR601 is an ethoxylated(4) bisphenol A diacrylate monomer available from Sartomer Company, Inc., SR492 is a propoxylated(3) trimethylol propane triacrylate monomer from Sartomer Company, Inc., SR494 is a ethoxylated pentaerthritol tetracrylate monomer available from Sartomer Company, Inc., SR9020 is a propoxylated(3) glyceryl triacrylate monomer available from Sartomer Company, Inc. SR349 is an ethoxylated(2) bisphenol A diacrylate monomer available from Sartomer Company, Inc, and SR295 is a pentaerythritol tetraacrylate available from Sartomer Company, Inc.

Of the photoinitiators listed in Table 7, Irgacure 1850 is a blend of 1-hydroxycyclohexyl phenyl ketone, and bis(2,6-dimethoxybenrzoyl)-2,4,4-trimethylpentyl phosphine oxide available from Ciba Specialty Chemical.

The above coatings were applied to an optical fiber as a secondary coating. Before applying the secondary coating, the fibers were first coated with a primary coating. The composition of the primary coatings used in the example are shown in Table 8.

TABLE 7

Secondary Composition Formulations Components

| | Oligomer | Wt % | Monomers | Wt % | Photoinitiator | Wt % | Additives pph | Young's Modulus |
|---|---|---|---|---|---|---|---|---|
| W | BR301 | 45 | SR492 | 17 | Irgacure 1850 | 3 | | 1700 |
| | | | SR494 | 20 | | | | |
| | | | SR601 | 15 | | | | |
| X | CN981 | 40 | SR9020 | 17 | Irgacure 1850 | 3 | | 2100 |
| | | | SR295 | 25 | | | | |
| | | | SR349 | 15 | | | | |

Of the oligomers listed in Table 7, BR301 is a polyether-based urethane diacrylate oligomer available from Bomar Specialty Co., CN981 is an urethane acrylate oligomer available from Sartomer Company, Inc.

The fiber coated with the above described inventive coatings was a high data rate single mode optical fiber. One example of such fiber is LEAF® available from Corning, Inc.

TABLE 8

Primary Coating Composition

Components

| | Oligomer | Wt % | Monomer(s) | Wt % | Photoinitiator | Wt % | Adhesion Promoter | pph | Additives | Pph | Young's Modulus |
|---|---|---|---|---|---|---|---|---|---|---|---|
| 4 | BR3731 | 52 | SR504 | 25 | Irgacure 1850 | 3 | Bis(trimethoxysilyl-ethyl)benzene | 1 | Irganox 1035 | 1.0 | 1.4 |
| | | | Tone M-100 | 20 | | | | | Tegorad 2200 | 0.5 | |
| | | | | | | | | | Acclaim 3201 | 1.0 | |
| 9 | KWS 6001 | 52 | Tone M-100 | 45 | Irgacure 1850 | 3 | Bis(trimethoxysilyl-ethyl)benzene | 1 | Irganox 1035 | 1.0 | 0.8 |
| | | | | | | | | | Tegorad 2200 | 0.5 | |

The coating 4 listed in table 8 is the same as coating 4 listed in table 3. Of the components listed in Table 8 above, BR373 is a polyether urethane acrylate oligomer available from Bomar Specialty Co., KWS6001 is a high molecular weight polyether urethane acrylate oligomer, SR504 is an ethoxylated nonylphenol acrylate monomer available from Sartomer Company, Inc., Tone M-100 is a caprolactone acrylate monomer available from Union-Carbide Corp. (Danbury, Conn.), Irgacure 1850 is a photoinitiator commercial blend of 1-hydroxycyclohexyl phenyl ketone and bis(2,6-dimethoxybenzoyl)-2,4,4-trimethylpentyl phosphine oxide available from Ciba Specialty Chemical, Irganox 1035 is an antioxidant containing thiodiethylene bis(3,5-di-tert-butyl-4-hydroxy) hydrocinnamate available from Ciba Specialty Chemical, Tegorad 2200 is a polyalkoxypolysiloxane available from Goldschmidt Chemical Co., and Acclaim 3201 is a polyethylene-co-polypropylene glycol available from Lyondell (Newtown Square, Pa.).

The microbend sensitivity of the coated optical fibers of example 4 was tested. Each fiber was tested in accordance with the Lateral Load Wire Mesh Test ("LLWM"). This test measures the spectral power of light launched through a fiber as a lateral load is applied to the fiber. Lateral load is a force normal to a cross section of the fiber. Each sample was tested five times.

A length of fiber is extended from a light source (a.k.a launch stage) to a detector stage. A preferred detector stage is a Photon Kinetics (hereinafter "PK") spectral attenuation measurement bench. A suitable device is Model 2500, optical fiber analysis system, from Photon Kinetics of Beaverton, Oreg. The user's manual for the model is incorporated herein by reference. The use of Model 2500 to perform the attenuation measurement is explained therein. The length of fiber must be sufficient to extend from the light source to the measurement bench. The length of fiber also should include a loose predetermined configuration of fiber disposed on an Instron as described below.

An Instron® is used to apply a lateral load on the fiber. An Instron® is a device capable of controllably applying a load on-a material. The force of the load can be controlled and measured as can the rate of loading as a function of time, as well as, the deformation imposed on the test sample of material (the piece of fiber) during the course of the loading event. A preferred Instron® is the Instron® 4502. Such devices are available through a number of suppliers, Instron® (Canton, Mass.) being one, and MTS Systems being another. The 4502 has a lower steel plate and an upper steel plate. The plates are oriented such that the force imposed by the upper plate on the lower plate is normal to the lower plate.

The sample of fiber to be tested is placed on a rubber pad attached to the lower plate. The rubber pad has a shore A Hardness of 70±5. It is essential to ensure that the rubber pad is flat and not marked by grooves of any sort. If necessary, replace or clean the rubber pad with isopropanol alcohol.

The fiber is looped approximately 340 degrees around a mandrel having a diameter of 98.5 mm. The fiber may be held in place on the rubber pad by no more than three pieces of thin tape with a maximum width of 3 mm each. A portion of the tape is cut away to prevent fiber crossover at the point where fiber ends exit the Instron.

The mandrel is removed and a number 70 wire mesh is placed on top of the fiber loop on the rubber pad, sandwiching the fiber between the rubber pad and the wire mesh. An initial attenuation of the fiber is recorded at 1310 nm, 1550 nm, and 1625 nm. A compressive lateral load is applied to the fiber in increments of 10 N. The total lateral load applied is increased up to 70 N. The induced attenuation is recorded for each incremental increase in lateral load. The average change in (a.k.a. delta ($\Delta$)) attenuation is calculated for each incremental load between 30 N and 70 N and is reported.

If so desired, the test may also be used to record the change in attenuation in terms of change in decibels ($\Delta$ dB) at each of the three aforementioned wavelengths. The change in attenuation is attributed to the compressive load. The change in attenuation is measured in accordance with the cut back method.

The cutback method calculates the optical loss characteristics of a fiber by measuring the power received on the output side the fiber at various lengths. The method includes launching an optical signal, of a relative strength, through a first end of the test fiber by the use of an optical source. A portion of the launched optical signal may travel in the cladding.

The signal is detected at a second end of the fiber and the power of the, signal at the second end is measured. The signal is detected by use of an optical detector. The detector accounts for all of the light at the second end of the fiber, irrespective if the light was propagated in the core or the cladding.

The length of fiber must be such that a detectable amount of the signal is present at the second end of the fiber. This length of fiber is known as $L_1$.

The fiber is cut to a length $L_2$, which is less than $L_1$. Once again an optical signal is transmitted through the fiber and the signal strength is detected at the second end of the fiber. The optical loss is determined based on the difference in signal strength for measurements at lengths $L_1$ and $L_2$. The optical loss is $10 \log_{10}$ (Power ($L_2$)/Power ($L_1$)). The attenuation is determined by dividing the optical loss by the difference in length between $L_1$ and $L_2$. The change in attenuation is measured as the load is applied in the same manner as the induced attenuation is measured.

Combinations of the above coatings listed in tables 7 and 8 and a control fiber were tested. The control fiber was a commercially available single mode fiber such as LEAF® fiber available from Corning, Incorporated, which has an $A_{eff}$ area of about 72 $\mu m^2$. The fiber was coated with a dual coating system. The dual coating system is available from DSM Desotech of Elgin, Ill. The primary coating of the control has a Young's modulus of 1.1 to 1.3 MPa. The secondary coating of the control has a Young's modulus of 500 to 700 MPa.

The test fiber with the inventive coating is identified in terms of the coating particularly secondary and primary coatings applied to the fiber. For example, fiber X4 was coated with secondary coating X of table 7 and primary coating 4 of table 8.

TABLE 9

Microbend Sensitivity Test 1550 nm

| Fiber ID | Prim mod (MPa) | Second mod (MPa) | Mode Field Diameter 1550 nm ($\mu m^2$) | Change in Signal Attenuation 70–30N (dB/m) 1550 nm |
|---|---|---|---|---|
| X4 | 1.4 | 2100 | 9.69 | 0.754 ± 0.632 |
| Control | 1.1–1.3 | 500–700 | 9.87 | 3.588 ± 0.694 |
| W4 | 1.4 | 1700 | 9.70 | 1.138 ± 0.782 |
| X9 | 0.8 | 2100 | 9.77 | 0.528 ± 0.229 |

TABLE 9-continued

Microbend Sensitivity Test

| | 1625 nm | | | |
|---|---|---|---|---|
| Fiber ID | Prim mod (MPa) | Second mod (MPa) | Mode Field Diameter @ 1625 nm ($\mu m^2$) | Change in Signal Attenuation 70–30N (dB/m) 1625 nm |
| X4 | 1.4 | 2100 | 10.54 | 1.276 ± 0.940 |
| Control | 1.1—1.3 | 500–700 | 10.84 | 4.603 ± 0.950 |
| W4 | 1.4 | 1700 | 10.58 | 1.436 ± 0.815 |
| X9 | 0.8 | 2100 | 10.70 | 0.748 ± 0.549 |

The change in attenuation of the signal transmitted through fibers X4, W4, and X9 of the invention was lower than the change in attenuation of the signal transmitted through the control fiber at both the 1550 and 1625 nm wavelengths when tested using the lateral load with mesh attenuation test.

The inventive coatings demonstrated a reduced microbend sensitivity. The inventive coatings exhibited a change in signal attenuation that varied from about 1.920 dB/m to about 0.122 dB/m at a wavelength of about 1550 nm and about 2.251 dB/m to about 0.199 dB/m at a wavelength of about 1625 nm. The control fiber exhibited a much greater microbend sensitivity. At a wavelength of about 1550 nm, the change in signal attenuation in the control fiber varied from about 4.182 dB/m to about 2.894 dB/m. At a wavelength of about 1625 nm, the change in signal attenuation varied from about 5.553 dB/m to about 3.653 dB/m.

Although the invention has been described in detail for the purpose of illustration, it is understood that such detail is solely for that purpose, and variations can be made therein by those skilled in the art without departing from the spirit and scope of the invention which is defined by the following claims.

What is claimed:

1. A composition for coating optical fibers comprising:
an oligomeric component present in an amount of about 15 weight percent or less and
a monomeric component present in an amount of about 75 weight percent or more,
wherein the monomeric component comprises two or more monomers when the composition is substantially devoid of the oligomeric component and the cured product of the composition has a Young's modulus of at least about 650 MPa.

2. The composition according to claim 1, wherein cured product of the composition has a Young's modulus of at least about 900 MPa.

3. The composition according to claim 1, wherein the cured product of the composition has a Young's modulus of at least about 1100 MPa.

4. The composition according to claim 1, wherein the cured product of the composition has a Young's modulus of at least about 1700 MPa.

5. The composition according to claim 1, wherein said oligomeric component comprises an ethylenically unsaturated oligomer.

6. The composition according to claim 5, wherein said ethylenically unsaturated oligomer is a difunctional oligomer according to formula (I)

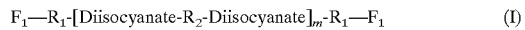

(I)

wherein $F_1$ is independently a reactive functional group selected from the group of acrylate, methacrylate, acrylamide, N-vinyl amide, styrene, vinyl ether, and vinyl ester;

$R_1$ is independently selected from the group of —$C_{2-12}$O—, —($C_{2-4}$—O)$_n$—, —$C_{2-12}$O—($C_{2-4}$—O)$_n$—, —$C_{2-12}$O—(CO—$C_{2-5}$O)$_n$—, and —$C_{2-12}$O—(CO—$C_{2-5}$NH)$_n$—;

$R_2$ is selected from the group of polyether, polyester, polycarbonate, polyamide, polyurethane, polyurea, and combinations thereof;

n is a whole number from 1 to 30; and m is a whole number from 1 to 10.

7. The composition according to claim 5, wherein said ethylenically unsaturated oligomer is a polyfunctional oligomer according to formula (II), (III) or (IV):

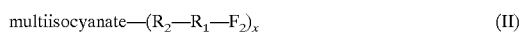

(II)

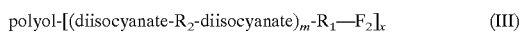

(III)

(IV)

wherein $F_2$ independently represents from 1 to 3 functional groups selected from the group of acrylate, methacrylate, acrylamide, N-vinyl amide, styrene, vinyl ether, and vinyl ester;

$R_1$ is independently selected from the group of —$C_{2-12}$O—, —($C_{2-4}$—O)$_n$—, —$C_{2-12}$O—($C_{2-4}$—O)$_n$—, —$C_{2-12}$O—(CO—$C_{2-5}$O)$_n$—, and —$C_{2-12}$O—(CO—$C_{2-5}$NH)$_n$—;

$R_2$ is selected from the group of polyether, polyester, polycarbonate, polyamide, polyurethane, polyurea and combinations thereof;

n is a whole number from 1 to 10;

x is a whole number from 1 to 10; and m is a whole number from 1 to 10.

8. The composition according to claim 1, wherein said oligomeric component is present in an amount of less than about 13 weight percent.

9. The composition according to claim 8, wherein said oligomeric component is present in an amount of less than about 10 weight percent.

10. The composition according to claim 9, wherein said composition is substantially devoid of said oligomeric component.

11. The composition according to claim 1, wherein said monomeric component comprises an ethylenically unsaturated monomer.

12. The composition according to claim 11, wherein said ethylenically unsaturated monomer is selected from the group of a monofunctional monomer, a polyfunctional monomer, and mixtures thereof.

13. The composition according to claim 11, wherein said ethylenically unsaturated monomer comprises a monofunctional monomer having a functional group selected from the group of acrylate, methacrylate, acrylamide, N-vinyl amide, styrene, vinyl ether, vinyl ester, and acid ester.

14. The composition according to claim 13, wherein said monofunctional ethylenically unsaturated monomer is selected from the group of hydroxyalkyl acrylates, long- and short-chain alkyl acrylates, aminoalkyl acrylates, alkoxyalkyl acrylates, single and multi-ring cyclic aromatic or non-aromatic acrylates, alcohol-based acrylates, acrylamides, vinylic compounds, acid esters, and combinations thereof.

15. The composition according to claim 11, wherein said ethylenically unsaturated monomer comprises a polyfunctional monomer having more than one functional group independently selected from the group of acrylate, methacrylate, acrylamide, N-vinyl amide, styrene, vinyl ether, vinyl ester, acid ester, and combinations thereof.

16. The composition according to claim 15, wherein said polyfunctional ethylenically unsaturated monomer is selected from the group of alkoxylated bisphenol A diacrylates, methylolpropane polyacrylates with and without alkoxylation, alkoxylated glyceryl triacrylates, erythritol polyacrylates with and without alkoxylation, isocyanurate polyacrylates, alcohol polyacrylates with and without alkoxylation, epoxy acrylates, single and multi-ring cyclic aromatic or non-aromatic polyacrylates, and combinations thereof.

17. The composition according to claim 1, wherein said monomeric component is present in an amount of about 80 to about 99 weight percent.

18. The composition according to claim 17, wherein said monomeric component is present in an amount of about 85 to about 98 weight percent.

19. The composition according to claim 1 further comprising:

a polymerization initiator.

20. The composition according to claim 1, wherein said oligomeric component comprises a polyether urethane acrylate oligomer present in an amount of about 10 weight percent, said monomeric component comprises a ethoxylated(8) bisphenol-A diacrylate monomer present in an amount of about 22 weight percent and a ethoxylated(4) bisphenol-A diacrylate monomer present in an amount of about 65 weight percent, and said composition further comprises a photoinitiator present in an amount of about 3 weight percent.

21. The composition according to claim 1, wherein the composition has a tensile strength of at least about 18 MPa when cured.

22. An optical fiber comprising:

a glass fiber;

a primary coating encapsulating said glass fiber; and a secondary coating encapsulating said primary coating, said secondary coating being the cured product of a composition comprising an oligomeric component present in an amount of about 15 weight percent or less; and a monomeric component present in an amount of about 75 weight percent or more;

wherein said secondary coating has a Young's modulus of at least about 650 MPa.

23. The optical fiber according to claim 22, wherein the cured product of the composition has a Young's modulus of at least about 900 MPa.

24. The optical fiber according to claim 23, wherein the cured product of the composition has a Young's modulus of at least about 1700 MPa.

25. The optical fiber according to claim 22, wherein said secondary coating has an outer surface having a coefficient of friction of less than about 0.43.

26. The optical fiber according to claim 22, wherein coefficient of friction is less than about 0.38.

27. The optical fiber according to claim 22, wherein said oligomeric component comprises an ethylenically unsaturated oligomer.

28. The optical fiber according to claim 27, wherein said ethylenically unsaturated oligomer is a difunctional oligomer according to formula (I)

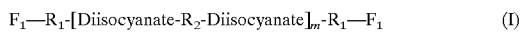

$$F_1-R_1-[\text{Diisocyanate}-R_2-\text{Diisocyanate}]_m-R_1-F_1 \qquad (I)$$

wherein $F_1$ is independently a reactive functional group selected from the group of acrylate, methacrylate, acrylamide, N-vinyl amide, styrene, vinyl ether, and vinyl ester;

$R_1$ is independently selected from the group of $-C_{2-12}O-$, $-(C_{2-4}-O)_n-$, $-C_{2-12}O-(C_{2-4}-O)_n-$, $-C_{2-12}O-(CO-C_{2-5}O)_n-$, and $-C_{2-12}O-(CO-C_{2-5}NH)_n-$;

$R_2$ is selected from the group of polyether, polyester, polycarbonate, polyamide, polyurethane, polyurea, and combinations thereof;

n is a whole number from 1 to 30; and m is a whole number from 1 to 10.

29. The optical fiber according to claim 27, wherein said ethylenically unsaturated oligomer is a polyfunctional oligomer according to formula (II) (III), or (IV):

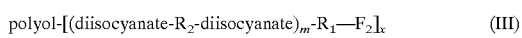

$$\text{multiisocyanate-}(R_2-R_1-F_2)_x \qquad (II)$$

$$\text{polyol-}[(\text{diisocyanate-}R_2\text{-diisocyanate})_m-R_1-F_2]_x \qquad (III)$$

$$\text{multiisocyanate-}(R_1-F_2)_x \qquad (IV)$$

wherein $F_2$ independently represents from 1 to 3 functional groups selected from the group of acrylate, methacrylate, acrylamide, N-vinyl amide, styrene, vinyl ether, and vinyl ester;

$R_1$ is independently selected from the group of $-C_{2-12}O-$, $-(C_{2-4}-O)_n-$, $-C_{2-12}O-(C_{2-4}-O)_n-$, $-C_{2-12}O-(CO-C_{2-5}O)_n-$, and $-C_{2-12}O-(CO-C_{2-5}NH)_n-$;

$R_2$ is selected from the group of polyether, polyester, polycarbonate, polyamide, polyurethane, polyurea, and combinations thereof;

n is a whole number from 1 to 10;

x is a whole number from 1 to 10; and m is a whole number from 1 to 10.

30. The optical fiber according to claim 22, wherein said oligomeric component is present in an amount of less than about 10 weight percent.

31. The optical fiber according to claim 30, wherein said composition is substantially devoid of said oligomeric component.

32. The optical fiber according to claim 31, wherein said monomeric component comprises two or more monomers.

33. The optical fiber according to claim 22, wherein said monomeric component comprises an ethylenically unsaturated monomer.

34. The optical fiber according to claim 33, wherein said ethylenically unsaturated monomer is selected from the group of a monofunctional monomer, a polyfunctional monomer, and mixtures thereof.

35. The optical fiber according to claim 22, wherein said monomeric component is present in an amount of about 80 to about 99 weight percent.

36. The optical fiber according to claim 35, wherein said monomeric component is present in an amount of about 85 to about 98 weight percent.

37. The optical fiber according to claim 22, wherein said composition further comprises:

a polymerization initiator.

38. The optical fiber according to claim 22, wherein said oligomeric component comprises a polyether urethane acrylate oligomer present in an amount of about 10 weight percent;

said monomeric component comprises a ethoxylated(8) bisphenol-A diacrylate monomer present in an amount of about 22 weight percent and a ethoxylated(4) bisphenol-A diacrylate monomer present in an amount of about 65 weight percent; and said composition further comprises a photoinitiator present in an amount of about 3 weight percent.

39. The optical fiber according to claim 22 wherein said Young's modulus is more than about 1300 MPa, and said primary coating has a Young's modulus of about 3.0 MPa or less.

40. The optical fiber according to claim 39 wherein said Young's modulus of said primary coating is about 1.5 MPa or less.

41. The optical fiber according to claim 23 having a microbend attenuation of less than 2.25 dB/m at a wavelength of 1550 nm.

42. The optical fiber according to claim 23 having a microbend attenuation of less than 0.53 dB/m at a wavelength of 1550 nm.

43. The optical fiber according to claim 23 having a microbend attenuation of less than 3.00 dB/m at a wavelength of 1625 nm.

44. The optical fiber according to claim 43 having a microbend attenuation of less than 0.75 dB/m at a wavelength of 1625 nm.

45. The optical fiber according to claim 22, wherein the secondary coating has a tensile strength of at least about 18 MPa.

* * * * *